United States Patent
Freeman et al.

(10) Patent No.: US 12,099,119 B2
(45) Date of Patent: Sep. 24, 2024

(54) SYSTEM AND METHOD FOR MAINTAINING SONAR IMAGING OF A STRUCTURE REGARDLESS OF BOAT ORIENTATION

(71) Applicants: Justin Freeman, Ball Ground, GA (US); Patrick Snellings, Sandy Springs, GA (US); Cherry Rafferty, Alpharetta, GA (US); Jun Feng, Marietta, GA (US); Thomas Harkman, Rice Lake, WI (US)

(72) Inventors: Justin Freeman, Ball Ground, GA (US); Patrick Snellings, Sandy Springs, GA (US); Cherry Rafferty, Alpharetta, GA (US); Jun Feng, Marietta, GA (US); Thomas Harkman, Rice Lake, WI (US)

(73) Assignee: Johnson Outdoors Inc., Racine, WI (US)

( * ) Notice: Subject to any disclaimer, the term of this patent is extended or adjusted under 35 U.S.C. 154(b) by 30 days.

(21) Appl. No.: 18/314,871

(22) Filed: May 10, 2023

(65) Prior Publication Data

US 2023/0375700 A1 Nov. 23, 2023

Related U.S. Application Data

(60) Provisional application No. 63/342,830, filed on May 17, 2022.

(51) Int. Cl.
*G01S 15/66* (2006.01)
*G01S 7/521* (2006.01)
(Continued)

(52) U.S. Cl.
CPC ............. *G01S 15/66* (2013.01); *G01S 7/521* (2013.01); *G01S 15/89* (2013.01); *G01S 15/96* (2013.01)

(58) Field of Classification Search
CPC .......... G01S 15/66; G01S 7/521; G01S 15/89; G01S 15/96; G01S 15/42; G01S 15/86
See application file for complete search history.

(56) References Cited

U.S. PATENT DOCUMENTS

| 4,692,722 A | 9/1987 | Reichel et al. |
| 5,013,979 A | 5/1991 | Birleson |

(Continued)

FOREIGN PATENT DOCUMENTS

| CN | 104937660 A | * 9/2015 | ............. G10K 15/02 |
| CN | 107140116 A | 9/2017 | |

(Continued)

OTHER PUBLICATIONS

Navico Holding AS; Lowrance SpotlightScan Operation Manual; 2014, publicly available prior to Jun. 25, 2020; 12 pages; Lowrance.com.

(Continued)

*Primary Examiner* — Daniel Pihulic
(74) *Attorney, Agent, or Firm* — Reinhart Boerner Van Deuren P.C.

(57) ABSTRACT

A sonar target locking system to position a sonar assembly to maintain the sonar array of the sonar assembly pointing at a position of a user set (desired) target even when the watercraft is rotating or moving in various motions. The sonar target locking system includes electro-mechanical assembly that can be steered electrically to maintain the sonar array pointing at the position of the desired target. The system may be activated using at least one of a foot pedal, handheld remote control, or a display of a fish finder head unit. The system may use GPS and IMU inputs to generate control signals to steer the electro-mechanical assembly to maintain the sonar array pointing at the position of the desired target.

29 Claims, 12 Drawing Sheets

(51) Int. Cl.
*G01S 15/89* (2006.01)
*G01S 15/96* (2006.01)

(56) References Cited

U.S. PATENT DOCUMENTS

| | | | |
|---|---|---|---|
| 5,182,732 | A | 1/1993 | Pichowkin |
| 5,525,081 | A | 6/1996 | Mardesich et al. |
| 5,923,617 | A | 7/1999 | Thompson et al. |
| 6,254,441 | B1 | 7/2001 | Knight et al. |
| 6,292,433 | B1 | 9/2001 | Gilbert et al. |
| 6,661,739 | B1 | 12/2003 | Benjamin et al. |
| 6,678,210 | B2 | 1/2004 | Rowe |
| 6,870,794 | B2 | 3/2005 | Healey |
| 7,606,114 | B2 | 10/2009 | Bachelor et al. |
| 7,889,600 | B2 | 2/2011 | Thompson et al. |
| 8,390,300 | B2 | 3/2013 | Ems et al. |
| 8,463,458 | B2 | 6/2013 | Wood et al. |
| 8,593,903 | B2 | 11/2013 | Pocwiardowski |
| 8,606,432 | B1 | 12/2013 | Wood et al. |
| 8,638,362 | B1 | 1/2014 | Thompson et al. |
| 8,811,120 | B2 | 8/2014 | Bachelor et al. |
| RE45,379 | E | 2/2015 | Rowe |
| 8,964,507 | B2 | 2/2015 | Bachelor et al. |
| 9,664,783 | B2 | 5/2017 | Brown et al. |
| 9,766,328 | B2 | 9/2017 | Black et al. |
| 9,784,825 | B2 | 10/2017 | Brown et al. |
| 9,784,826 | B2 | 10/2017 | Matson et al. |
| 9,812,118 | B2 | 11/2017 | Matson et al. |
| 10,310,062 | B2 | 6/2019 | Coleman et al. |
| 10,338,195 | B2 | 7/2019 | Stokes et al. |
| 10,416,307 | B2 | 9/2019 | Stokes et al. |
| 10,454,398 | B2 | 10/2019 | Hanseler et al. |
| 10,545,226 | B2 | 1/2020 | Wigh et al. |
| 10,597,130 | B2 | 3/2020 | Antao et al. |
| 10,719,077 | B2 | 7/2020 | Clark et al. |
| 10,852,429 | B2 | 12/2020 | Gatland |
| 10,890,660 | B2 | 1/2021 | Wigh et al. |
| 11,173,996 | B2 | 11/2021 | Salmon et al. |
| 2003/0223310 | A1 | 12/2003 | Benjamin et al. |
| 2006/0050615 | A1 | 3/2006 | Swisher |
| 2009/0037040 | A1 | 2/2009 | Salmon et al. |
| 2010/0014386 | A1* | 1/2010 | Thompson .............. G01S 15/89 367/103 |
| 2014/0269191 | A1 | 9/2014 | Iverson et al. |
| 2014/0321242 | A1 | 10/2014 | Acker et al. |
| 2016/0259055 | A1 | 9/2016 | Betts et al. |
| 2017/0212230 | A1 | 7/2017 | Wigh et al. |
| 2018/0100922 | A1 | 4/2018 | Wigh et al. |
| 2018/0217244 | A1 | 8/2018 | Coleman et al. |
| 2019/0064348 | A1 | 2/2019 | Clark et al. |
| 2019/0072951 | A1 | 3/2019 | Clark et al. |
| 2019/0179318 | A1 | 6/2019 | Miller et al. |
| 2019/0242994 | A1 | 8/2019 | Wanis et al. |
| 2019/0331779 | A1 | 10/2019 | Sandretto |
| 2020/0049507 | A1 | 2/2020 | Clark et al. |
| 2020/0072953 | A1 | 3/2020 | Wigh et al. |
| 2020/0103512 | A1 | 4/2020 | Brown et al. |
| 2020/0158842 | A1 | 5/2020 | Wigh et al. |
| 2020/0256967 | A1 | 8/2020 | Wigh et al. |
| 2020/0292701 | A1 | 9/2020 | Darrow |
| 2020/0341463 | A1 | 10/2020 | Clark et al. |
| 2021/0015068 | A1 | 1/2021 | Stoll |
| 2021/0096244 | A1 | 4/2021 | Wigh et al. |
| 2021/0263150 | A1 | 8/2021 | Stokes |
| 2023/0375700 | A1* | 11/2023 | Freeman ................ G01S 15/66 |

FOREIGN PATENT DOCUMENTS

| | | | | |
|---|---|---|---|---|
| CN | 109975815 B | * | 9/2021 | |
| WO | WO-2023224854 A1 | * | 11/2023 | ............ G01S 15/66 |

OTHER PUBLICATIONS

Kenneth G. Foote et al.; Protocols for calibrating multibeam sonar; University of New Hampshire Scholars Repository; https://scholars.unh.edu/ccom; Apr. 2005; 17 pages.

Kevin L. Haskins et al.; Interaction between Brash Ice and Boat Propulsion Systems; U.S. Army Corps of Engineers ERDC; https://apps.dtic.mil/sti/citations/ADA596756; Feb. 2014; 95 pages.

U.S. Appl. No. 17/217,319, Clark et al., filed Mar. 30, 2021.

U.S. Appl. No. 17/352,625, Gibson et al., filed Jun. 21, 2021.

* cited by examiner

SYSTEM AND METHOD FOR MAINTAINING SONAR IMAGING OF A STRUCTURE REGARDLESS OF BOAT ORIENTATION

CROSS-REFERENCE TO RELATED PATENT APPLICATIONS

This patent application claims the benefit of U.S. Provisional Patent Application No. 63/342,830, filed May 17, 2022, the entire teachings and disclosure of which are incorporated herein by reference thereto.

FIELD OF THE INVENTION

This invention generally relates to consumer fish finders, and more particularly to control of sonar imaging of underwater structures for use in consumer fish finders.

BACKGROUND OF THE INVENTION

Advances in consumer fish finder sonar technology have yielded significant improvements in fish and underwater structure location and imaging. Indeed, MEGA Imaging® available from Humminbird® of Eufaula, Alabama, takes fish finding into the megahertz range of the sonar signal for more detail than has ever been available before. Pioneered by Humminbird®, the clarity of MEGA Imaging® can help an angler easily distinguish fish from structure, see the direction fish are facing and even target individual species. Indeed, with the different types and configurations of equipment, such high quality sonar imaging may provide side imaging, down imaging, and imaging 360 degrees around the angler's boat.

The Side Imaging® products deliver an incredible view to both sides of an angler's boat with extended range out to 200 feet on either side as depicted in FIG. 1. Down Imaging® products are configured to show an angler what is directly below the boat to a depth down to 200 feet in crystal-clear detail as depicted in FIG. 2. The 360 Imaging products sweep up to 125 feet in every direction around an angler's boat to deliver the clearest images ever seen of structure, the bottom and fish, even while the boat is sitting still as depicted in FIG. 3. Such technology allows more accurate casts, more unforgettable moments and more incredible MEGA Imaging® all around thanks to the 360-degree view of the water that is constantly updating with the boat at the center.

This product allows an angler to mark a waypoint directly on a Humminbird® screen at the location of a displayed fish, structure, etc., and will then provide range rings to show the distance from the boat to the target. This allows an angler to line up and cast to where the fish are. Indeed, it is possible to customize the sweep area from 360 degrees down to 10 degrees as depicted in FIG. 4. FIGS. 5-7 depict current products available from the assignee of the present application that provide such 360 degree sonar imaging and can be mounted on a trolling motor shaft or stand alone as desired by the angler.

While the above described advances in sonar technology provides the modern angler with the most realistic imaging of the underwater environment, including imaging of the angler's quarry, some forward-looking and down-looking sonar technology uses a sonar beam that is relatively small (roughly 25 degrees). As such, the sonar array must be constantly manually steered by the angler to keep it facing at the angler's intended target. Indeed, while the customized sweep area of the 360 Imaging product cuts down on that needed manual steering to keep the intended target in frame on the fishfinder display, wind, current, and other forces that move the orientation of the angler's boat soon also require manual steering adjustment to get the target back in frame.

In view of the above, what is needed is a system and method to continually steer a sonar to keep the intended target in frame regardless of movement of the angler's boat while fishing. Embodiments of the present invention provide such systems and methods. These and other advantages of the invention, as well as additional inventive features, will be apparent from the description of the invention provided herein.

BRIEF SUMMARY OF THE INVENTION

In one aspect, embodiments of the present invention provide a system that allow automatic hands and feet free control of the steering of the sonar beam to lock onto an underwater target and continue to keep that target in frame regardless of the movement of the user's boat.

In one example, a sonar target locking system to position a sonar array to maintain the sonar array pointing at an user set target includes an electro-mechanical assembly, a positioning system and a controller. The electro-mechanical assembly is operable to carry and position the sonar array. The positioning system includes a GPS unit. The positioning system is configured to identify a position of the user set target and to determine changes in the position of the sonar array relative to the position of the user set target. The controller uses the position of the user set target and the changes in the position of the sonar array to control the electro-mechanical assembly to steer the position of the sonar array so that the sonar array remains pointed at the position of the user set target.

Notably, this prior system does not include the sonar array but is instead a system to which the sonar array can be attached.

The controller may be part of the positioning system and assist in identifying the position of the user set target and/or determine changes in position of the sonar array.

In one example, the positioning system includes an Inertial Measurement Unit (IMU) that assists in determining changes in the position of the sonar array.

In one example, the IMU includes at least one sensor to sense acceleration, velocity and/or heading of the electro-mechanical assembly and/or an attached sonar array. The IMU may include gyroscopes, speedometers, accelerometers, etc.

In one example, the controller is part of a fish finder control head.

In one example, the sonar array is a sweeping sonar array that electro-mechanically sweeps a predefined area to be imaged. The electro-mechanical assembly operable to carry and position the sonar array performs the electro-mechanical sweeping of the sonar array and the controller controls the signal for performing the electro-mechanical sweeping to maintain the sonar array pointed at the position of the user set target, even when the sonar array is moving relative to the position of the user set target.

In one example, the sonar array is a sweeping sonar array that electro-mechanically sweeps a predefined area to be imaged. A single motor electro-mechanically performs the electro-mechanical sweeping as well as steers the sonar array such that the sonar array remains pointed at the position of the user set target.

In one example, the sonar array is a sweeping sonar array that electro-mechanically sweeps a predefined area to be imaged. The controller controls the electro-mechanical assembly operable to carry and position the sonar array independent of any control of the electro-mechanical sweeping of the sonar array. For example, two separate motors may be used. One motor for sweeping and a second motor for changing position of the sonar array.

In a more particular example, the sonar array is part of a transducer assembly that also includes a first motor. The first motor drives the sonar array to electro-mechanically sweep a predefined area to be imaged. This can include oscillating back and forth within a predefined scanning sector. The electro-mechanical assembly includes a second motor. The electro-mechanical assembly operably carries the transducer assembly. The second motor adjusts the position of the transducer assembly including the sonar array and the first motor to maintain the sonar array pointed at the position of the user set target.

In one example, the system includes an user input device to activate the controller to control the electro-mechanical assembly to maintain the sonar array pointing at the position of the user set target.

In one example, the user input device is selected from the group consisting of a button on foot pedal, an input device of a fish finder control head, or a button on a remote. In particular examples, the foot pedal could be for controlling steering of a trolling motor or a separate foot pedal.

In an example, a sonar imaging system includes a sonar target locking system as outlined above. The system also includes a sonar array attached to the electro-mechanical assembly.

In an example, a method of maintaining a sonar array pointed at a user set target is provided. The method includes identifying a position of a user set target. The method includes pointing the sonar array at the position of the user set target. The method includes determining changes in the position of the sonar array relative to the position of the user set target, with a controller. The method includes maintaining the sonar array pointed at the position of the user set target by controlling an electro-mechanical assembly carrying the sonar array to adjust a position of the sonar array, with control signals generated by the controller.

In an example, the step of identifying a position of a user set target includes using a GPS unit.

In an example, the step of determining changes in the position of the sonar array relative to the position of the user set target, includes using a GPS unit, an Inertial Measurement Unit (IMU) or both a GPS unit and an IMU.

In an example, the method includes sweeping, with a motor of the electro-mechanical assembly carrying the sonar, the sonar array to perform sector scanning within a predefined angle. Sweeping and maintaining the sonar array pointed at the position of the user set target are performed by the same motor.

In one example, the method includes sweeping, with a first motor, the sonar array to perform sector scanning within a predefined angle. The electro-mechanical assembly that adjusts the position of the sonar array includes a second motor for maintaining the sonar array pointed at the position of the user set. Maintaining the sonar array pointed at the position of the user set target includes adjusting a position of the sonar array and the first motor with the second motor.

In one example, identifying the position of the user set target includes identifying a waypoint using a fish finder control head that includes a GPS unit. The GPS unit of the control head need not be within the housing of the control head but could be remote from the housing of the control head.

In one example, pointing the sonar array at the position of the user set target is performed by manually controlling the position of the sonar array until the sonar array is pointed at the position of the user set target.

In one example, manually controlling the position of the sonar array includes controlling the position of the sonar array using manual inputs to a foot pedal, manual inputs to a fish finder control head or manual inputs to a remote control.

In one example, the step of identifying the position of the user set target occurs after the step of pointing the sonar array at the position of the user set target. This allows a user to view the target, such as on a fish finder control head, and then using the fish finder control head to set a waypoint or other positioning information on the user set target.

In one example, the step of identifying the position of the user set target occurs prior to the step of pointing the sonar array at the position of the user set target. In this situation, the user could have predefined coordinates of the target or could have a pre-saved waypoint.

In an example, a sonar imaging system for use with a trolling motor includes a sonar array, an electro-mechanical assembly, and a controller. The electro-mechanical assembly carries and positions the sonar array. The electro-mechanical assembly includes a first motor. The first motor is not used to steer the trolling motor. The controller controls the electro-mechanical assembly to steer the position of the sonar array so that the sonar array remains pointed in the same direction as the trolling motor is pointed.

In one example, the controller receives trolling motor direction information indicative of the direction the trolling motor is pointed and uses the trolling motor direction information to control the first motor.

In one example, the controller receives trolling motor steering control signals and the controller uses the trolling motor steering control signals as an input to control the first motor.

In an example, a method of controlling the positioning of a sonar imaging system including a sonar array includes steering a trolling motor. This includes changing the direction of the trolling motor. The method includes steering the sonar array, using an electro-mechanical assembly including a first motor that is not used to steer the trolling motor. Steering of the sonar array is such that the sonar array remains pointing in the same direction as the trolling motor.

In one example, the method includes receiving trolling motor steering control signals and the step of steering the sonar array includes using the trolling motor steering control signals to control the first motor.

In one example, the method includes receiving trolling motor direction information indicative of the direction the trolling motor is pointed. The step of steering the sonar array includes using the trolling motor direction information to control the first motor.

In one embodiment the system utilizes an Inertial Measurement Unit(s) (IMU) in conjunction with GPS technology, a Humminbird Control Head and communication technology, e.g. Ethernet capability, to point the sonar array at an intended target. Preferably, the system will continually steer the array to continue to point towards that target even when the boat is rotating or moving in various motions. In one embodiment, the system will control the orientation of the sonar array via an electro-mechanical assembly that can be steered electrically with a servo motor. In one embodiment the system will control the orientation of the sonar array by adjusting the angular coverage of the 360 degree sonar imaging sector scan function available with the 360 Imaging product.

In one embodiment the sonar transducer steering assembly is connected to the fishfinder control head via Ethernet. In other embodiments, the communication is accomplished via wireless technology.

In one embodiment, the assembly is pointed towards a target using a foot control. Once the target is in frame, the user can then push a button to lock on the structure and the system and method will keep the sonar array pointed in the direction of the target regardless of boat movement and changes in orientation or drift regardless of the cause.

In one embodiment the user can set a waypoint on the head unit of the fishfinder at the structure on which the user wishes to lock the sonar display. The system will then control the direction and orientation of the sonar array to point at that specific waypoint or waypoints regardless of boat movement and changes in orientation or drift regardless of the cause.

In one embodiment the system operates in conjunction with the trolling motor as it automatically positions the boat around a fishing target while steering the transducer to remain locked on its target for hands and foot free fishing.

In another example, a sonar target locking system to position a sonar array to maintain a beam of the sonar array pointing at an user set target includes an electro-mechanical assembly, a positioning system, and a controller. The electro-mechanical assembly operably carries or is configured to carry and position the sonar array. The positioning system includes a GPS unit. The positioning system is configured to identify a position of the user set target and to determine changes in the position of the sonar array relative to the position of the user set target. The positioning system has a user input device. In a first mode, the positioning system identifies the position of the user set target when the user input device is activated. The positioning system identifies the user set target based on an axis defined by the orientation of the sonar array and a distance from a location of the sonar array when the user input device is activated along the axis. In some examples, this axis is determined by a heading sensor. The controller is configured to use the position of the user set target and the changes in the position of the sonar array to control the electro-mechanical assembly to steer the position of the sonar array so that the beam of the sonar array remains pointed at the position of the user set target.

In one example, the sonar array is operably connected to a fish finder control head that displays an image based on data generated by the sonar array. The image has a horizontal distance component. The distance from the sonar array used to determine user set target is a percentage of the horizontal distance component of the image displayed on the fish finder control head. The percentage is less than 100 percent.

In one example, the distance from the sonar array is a predetermined fixed value.

In one example, the distance from the sonar array is a user defined value that may be adjusted.

In one example, the user input device is a button on a foot pedal.

In one example, the user input device is a button on a fish finder control head in operable communication with the positioning system.

In one example, the orientation of the sonar array is determined using a heading sensor.

In one example, the heading sensor is mounted to rotate with the sonar array when the sonar array is rotated by the electro-mechanical assembly.

In one example, in a second mode, the position of the user set target is determined by a user input waypoint having coordinates within a coordinate system of the GPS unit.

In one example, in the second mode, the coordinates of the waypoint can be identified by a user selecting a location representative of a map being displayed on a fish finder control unit in communication with the positioning system.

In one example, the distance from the sonar array is measured in a horizontal plane.

In one example, the distance from the sonar array is compensated by a depth component.

In one example, the depth component is taken from contour depth information of a contour map.

In one example, the contour depth information is taken at the location of the sonar array.

In one example, the depth component is determined from sonar data.

In one example, the depth component is determined substantially real time.

In one example, the sonar data is sonar data of the sonar array or of a separate sonar array in operably communication with the system.

In one example, the contour depth information of the contour map is provided by a contour map loaded onto a fish finder control head in communication with or providing the controller and/or the positioning system.

In another example, a method of maintaining a sonar array pointed at a user set target is provided. The method includes identifying a position of a user set target by determining an orientation of the sonar array and using a distance from the position of the sonar array along an axis defined by the orientation of the sonar array. The method includes pointing the sonar array at the identified position of the user set target. The method includes determining changes in the position of the sonar array relative to the position of the user set target, with a controller. The method includes maintaining the sonar array pointed at the position of the user set target by controlling an electro-mechanical assembly carrying the sonar array to adjust a position of the sonar array, with control signals generated by the controller.

In one example, the orientation of the sonar array is determined using a heading sensor.

In one example, the distance is a predetermined fixed distance.

In one example, the method includes displaying an image based on sonar information from the sonar array on a fish finder control head. The image has a horizontal distance component. The distance from the sonar array used to determine user set target is a percentage of the horizontal distance component of the image displayed on the fish finder control head. The percentage is less than 100 percent.

In one example, the method includes manually inputting the value of the distance.

In one example, identifying the position of the user set target includes using a depth component.

In one example, the depth component is taken from contour depth information of a contour map.

In one example, the contour depth information is taken at the location of the sonar array.

In one example, the depth component is determined from sonar data.

In one example, the depth component is determined substantially real time.

In one example, the sonar data is sonar data of the sonar array or sonar data of a separate sonar array in operably communication with the system.

In one example, the contour depth information of the contour map is provided by a contour map loaded onto a fish finder control head in communication with or providing the controller and/or the positioning system.

In another example, a sonar target locking system to position a sonar array to maintain the beam of the sonar array pointing at an user set target is provided. The system includes an electro-mechanical assembly, a positioning system, and a controller. The electro-mechanical assembly operably carries or is configured to carry and position the sonar array. The electro-mechanical assembly includes a first actuator for rotating the sonar array about a first axis being horizontal or alternatively being vertical. The positioning system is configured to determine changes in a position of the sonar array relative to a position of the user set target. The controller is configured to use the position of the user set target and the changes in the position of the sonar array to control the electro-mechanical assembly to steer the position of the sonar array so that the sonar array remains pointed at the position of the user set target.

In one example, the controller automatically controls the first actuator based on changes in depth information at either of the location of the sonar array or the position of the user set target.

In one example, the controller automatically controls the first actuator based on changes in the distance of the sonar array from the position of the user set target.

In one implementation, the first actuator is controlled to aim the sonar array more downward when the distance is reduced and more forward when the distance is increased.

In one example, the controller controls the first actuator to orient the beam of the sonar array to be more outward facing when the depth information indicates a decrease in depth and the controller controls the second actuator to orient the beam of the sonar array to be more downward facing when the depth information indicates an increase in depth.

In one example, a user input device selectively generates a first control signal to actuate the first actuator to rotate in a first direction about the first axis and for selectively generating a second control signal to actuate the first actuator to rotate in a second direction about the second axis. The second direction being opposite the first direction.

In one example, a second actuator for rotates the sonar array about a second axis being vertical.

In one example, the first actuator makes adjustments in the orientation of the beam in a vertical plane and the second actuator makes adjustments in the orientation of the beam in a horizontal plane.

In one example, the user input device is a foot pedal, a remote, a fish finder control head, a phone, or a button on a foot pedal for controlling a trolling motor.

In one example, the electro-mechanical assembly is stowable and deployable between a stowed position and a deployed position. The sonar array is positioned out of a body of water when stowed and is positioned within the body of water in the deployed position. The first actuator can rotate the sonar array about the first axis when the electro-mechanical assembly is in the deployed position.

In one example, the controller controls the first actuator to adjust the vertical orientation of the beam of the sonar array based on receipt of a first user input signal to a first predetermined orientation.

In one example, the controller controls the first actuator to adjust the vertical orientation of the beam of the sonar array based on receipt of a second user input signal to a second predetermined orientation different than the first predetermined orientation. The second predetermined orientation is more vertically downward than the first predetermined orientation.

In one example, the first and second user input signals are generated by a same button.

In an example, a method of maintaining a beam of a sonar array pointed at a user set target is provided. The method includes identifying a position of a user set target. The method includes determining changes in the position of the sonar array relative to the position of the user set target, with a controller. The method includes maintaining the sonar array pointed at the position of the user set target by controlling an electro-mechanical assembly carrying the sonar array to adjust a position of the sonar array, with control signals generated by the controller. The method includes changing, using a first actuator, a vertical orientation of the beam of the sonar array about a horizontal axis based on an actuation event.

In one example, the method includes determining a change in depth at either the location of the sonar array or the position of the user set target. The change in depth is the actuation event.

In one example, determining the change in depth includes using contour information from a depth contour map and positional data taken from a GPS unit.

In one example, determining the change in depth uses sonar data obtained by the sonar array or another sonar array.

In one example, determining the change in depth is performed realtime.

In one example, the determined change in depth must be greater than a predetermined amount before the orientation of the sonar array about the horizontal axis will be changed.

In one example, changing the orientation of the sonar array about the horizontal axis includes changing the orientation of the sonar array to be more horizontally facing (e.g. outward facing) if the change in depth is a decrease in depth and changing the orientation of the sonar array about the horizontal axis includes changing the orientation of the sonar array to be more vertically facing (e.g. downward facing) if the change in depth is an increase in depth.

In one example, the actuation event is deployment of the electro-mechanical assembly from a stowed position to a deployed position.

In one example, the actuation event is a change in horizontal distance between the sonar array and the position of the user set target.

In an example, an apparatus for maintain a watercraft at a user set watercraft location for maintaining a sonar array pointing at a position of a user set target is provided. The system includes a trolling motor having a propulsion unit and an actuator operably coupled to the propulsion unit to steer the propulsion unit about a vertical axis. The system includes a sonar array operably attached to the trolling motor and fixed relative to the propulsion unit such that steering of the propulsion unit simultaneously steers the sonar array about the vertical axis. The system includes a watercraft positioning system configured to determine changes in the position of the watercraft relative to the user set watercraft location. The system includes a sonar array positioning system configured to determine changes in the position of the sonar array relative to the position of the user set target. The system includes a controller configured to operate in a first mode wherein the controller uses the changes in position of the watercraft relative to the user set watercraft location to control steering of the propulsion unit with the actuator and to control activation of the propulsion unit to maintain the watercraft proximate the user set watercraft location. The controller is configured to operate in a second mode wherein the controller uses the changes in the position of the sonar array relative to position of the user set target to steer the propulsion unit and sonar array with the actuator to maintain the sonar array aimed at the position of the user set target.

In one example, the controller prioritizes the first mode.

In one example, the watercraft positioning system uses GPS to determine changes in the position of the watercraft relative to the user set watercraft location. The sonar positioning system uses GPS to determine changes in the position of the sonar array relative to the position of the user set target.

In one example, the trolling motor includes a shaft attached to the propulsion unit. The sonar array is mounted to the shaft. The actuator rotates the shaft about the vertical axis to steer the propulsion unit about the vertical axis and to steer the sonar array about the vertical axis.

In one example, the propulsion unit is deactivated when the controller operates in the second mode.

In one example, the sonar array is steered with the propulsion unit in both the first and second modes.

In one example, the positioning system uses a heading sensor.

In an example, a method of maintaining a position of a watercraft at a user set watercraft location and maintaining a sonar array pointing at a position of a user set target is provided. The method includes determining, with a watercraft positioning system, changes in the position of the watercraft relative to the user set watercraft location. The method includes determining, with a sonar array positioning system, changes in the position of the sonar array relative to the position of the user set target. The method includes steering and activating a propulsion unit of a trolling motor, with a controller in a first mode, based on the changes in position of the watercraft relative to the user set watercraft location to maintain the watercraft proximate the user set watercraft location. Steering includes rotating the propulsion unit and the sonar array about a vertical axis with an actuator. The sonar array is operably fixed relative to the propulsion unit. The method includes steering the propulsion unit and the sonar array, with a controller in a second mode, about the vertical axis with the actuator based on changes in the position of the sonar array relative to position of the user set target to maintain the sonar array aimed at the position of the user set target.

In one example, the method includes prioritizing operating the controller in the first mode over operating the controller in the second mode.

In one example, the controller operates in the second mode when the changes in position of the watercraft relative to the user set watercraft location are less than a predetermined distance.

In one example, the method includes determining the changes in the position of the watercraft relative to the user set watercraft location uses a first GPS unit. The method includes determining changes in the position of the sonar array relative to the position of the user set target uses the first GPS unit and/or a second GPS unit.

In one example, a sonar positioning system to position a beam of a sonar array is provided. The system includes an electro-mechanical assembly operable to carry and position the sonar array. The system includes a positioning system configured to determine changes in the position of the sonar array relative to a position of an user set target. The system includes a controller configured to use the position of the user set target and the changes in the position of the sonar array to control the electro-mechanical assembly to steer the position of the sonar array so that the beam of the sonar array remains pointed at the position of the user set target. The controller is configured to automatically control the electro-mechanical assembly to orient the sonar array to a predetermined orientation upon an input signal.

In one example, the electro-mechanical assembly is deployable and stowable between a deployed position where the sonar array would be carried within a body of water and a stowed position wherein the sonar array would be carried out of the body of water. The input signal is generated upon a transition of the electro-mechanical assembly from the stowed position to the deployed position.

In one example, the predetermined orientation corresponds to orienting the beam of the sonar array parallel to a centerline of a watercraft to which the electro-mechanical assembly is mounted.

In one example, the predetermined orientation corresponds to orienting the beam of the sonar array towards the position of a user set target that was created prior to deploying the electro-mechanical assembly.

In one example, the user set target is located within a predetermined distances from the sonar array when the electro-mechanical assembly is deployed.

In one example, the predetermined distance is less than or equal to a range dimension of an image displayed on a fish finder control head for displaying an image based on sonar data generated by the sonar array.

In one example, the predetermined orientation corresponds to orienting the beam of the sonar array towards the position of a closest user set target located within a predetermined distance from the sonar array that was created prior to deploying the electro-mechanical assembly.

In one example, the predetermined orientation corresponds to orienting the beam of the sonar array towards the position of a closest user set target that was created prior to deploying the electro-mechanical assembly. The closest user set target is located within a predetermined area proximate the sonar array.

In one example, the predetermined area is a circle extending around the sonar array has a predetermined radius.

In one example, the predetermined area is a first portion of a circle that extends around the sonar array. A second portion of the circle is an exclusion zone. The predetermined orientation will not correspond to an user set target that was created prior to deploying the electro-mechanical assembly located within the exclusion zone.

In one example, the input signal is generated by pressing of a button by a user.

In one example, the button is part of a foot pedal, a fish finder control head, a remote control, or an app on a phone.

In one example, the input signal is generated by a wet switch that determines that the electro-mechanical assembly has been deployed such that the sonar array is located within water.

In one example, the input signal is generated by setting a waypoint and the predetermined orientation aims the sonar array at the waypoint.

In an example, a sonar target locking system to position a sonar array to maintain a beam of the sonar array pointing at an user set target is provided. The system includes an electro-mechanical assembly operable to carry and position the sonar array. The system includes a positioning system to determine changes in the position of the sonar array relative to a position of the user set target. The system includes a controller configured to use the position of the user set target and the changes in the position of the sonar array to control the electro-mechanical assembly to steer the position of the sonar array so that the beam of the sonar array remains pointed at the position of the user set target. In a particular example, the electro-mechanical assembly includes a first actuator for rotating the sonar array about a first axis that is a vertical axis.

In an example, a sonar target locking system to position a sonar array having a beam is provided. The system includes an electro-mechanical assembly operable to carry and position the sonar array. The system includes a positioning system that determines changes in the position of the sonar array relative to a position of the user set target. The system includes a controller configured to use the position of the user set target and the changes in the position of the sonar array to control the electro-mechanical assembly to steer the position of the sonar array so that the beam of the sonar array remains pointed at the position of the user set target. The system includes a user input device for manually controlling the electro-mechanical assembly to position the sonar array. When the controller is controlling the electro-mechanical assembly to steer the position of the sonar array based on changes in the position of the sonar array relative to the user set target and the user input device is activated to manually control the electro-mechanical assembly to manually steer the position of the sonar array and upon discontinued manual control of the electro-mechanical assembly, the controller automatically controls the electro-mechanical assembly to aim the sonar array such that the beam is aimed at the position of the user set target at which the beam was being aimed prior to activation of the user input device.

In one example, activation of the user input device overrides operation of the controller to use the changes in the position of the sonar array to control the electro-mechanical assembly to steer the position of the sonar array so that the beam of the sonar array remains pointed at the position of the user set target to control of the electro-mechanical assembly provided by the controller.

In an example, a sonar target locking system to position a sonar array having a beam is provided. The system includes an electro-mechanical assembly operable to carry and position the sonar array. The system includes a positioning system that determines changes in the position of the sonar array relative to a position of the user set target. The system includes a controller configured to use the position of the user set target and the changes in the position of the sonar array to control the electro-mechanical assembly to steer the position of the sonar array so that the beam of the sonar array remains pointed at the position of the user set target. The system includes a user input device for manually controlling the electro-mechanical assembly to position the sonar array. When the controller is controlling the electro-mechanical assembly to steer the position of the sonar array based on changes in the position of the sonar array relative to the user set target and the user input device is activated to manually control the electro-mechanical assembly to manually steer the position of the sonar array and upon discontinued manual control of the electro-mechanical assembly, the positioning system identifies a position of a new user set target. The controller automatically controls the electro-mechanical assembly to steer the position of the sonar array to maintain the beam aimed at the position of the new user set target.

In one example, the position of the new user set target is identified based on a heading of the sonar array when manual control of the electro-mechanical assembly is discontinued in combination with a distance from sonar array.

In one example, activation of the user input device overrides operation of the controller to use the changes in the position of the sonar array to control the electro-mechanical assembly to steer the position of the sonar array so that the beam of the sonar array remains pointed at the position of the user set target to control of the electro-mechanical assembly provided by the controller.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 8:
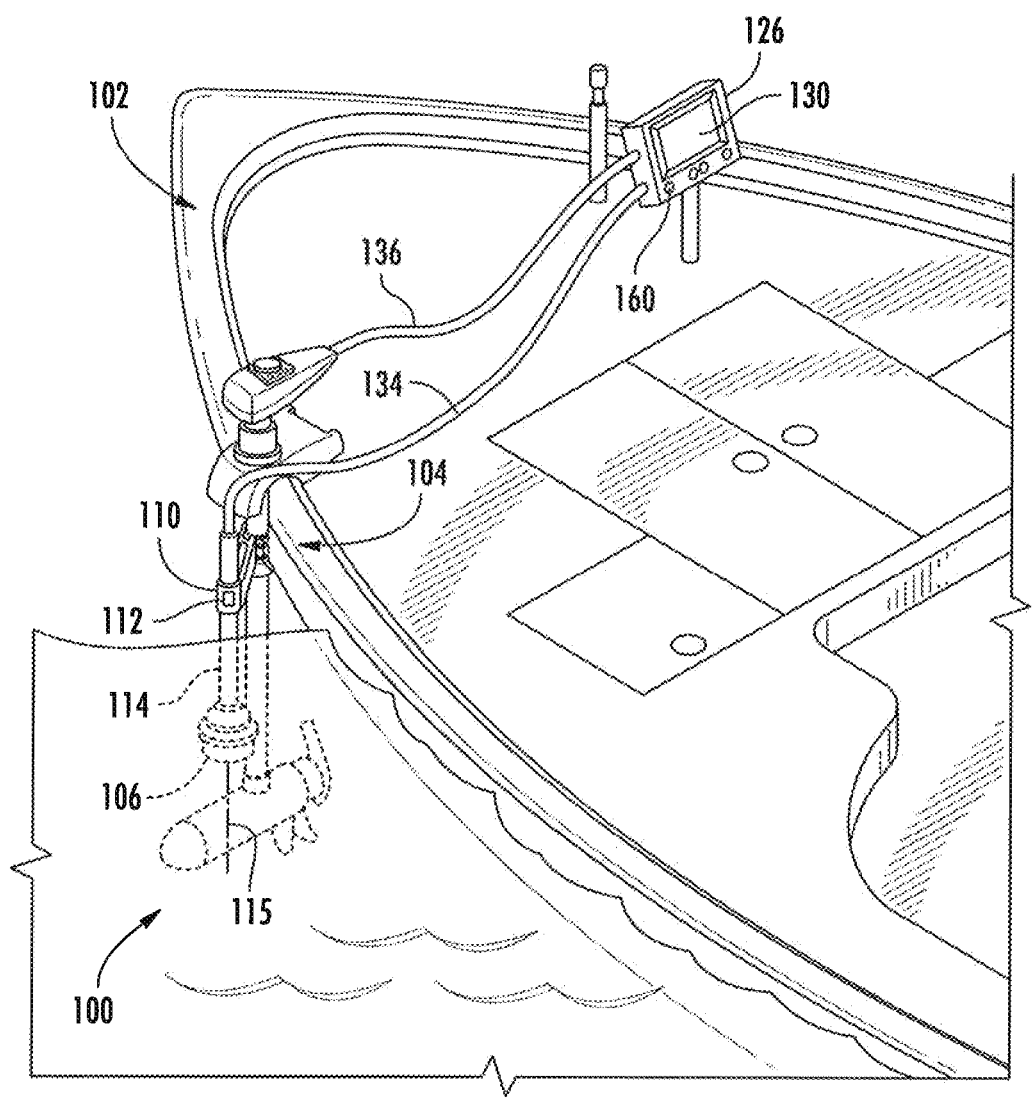
FIG. 8 is an illustration of a watercraft including a sonar imaging system according to an example of the application mounted to a trolling motor.
Figure 9:
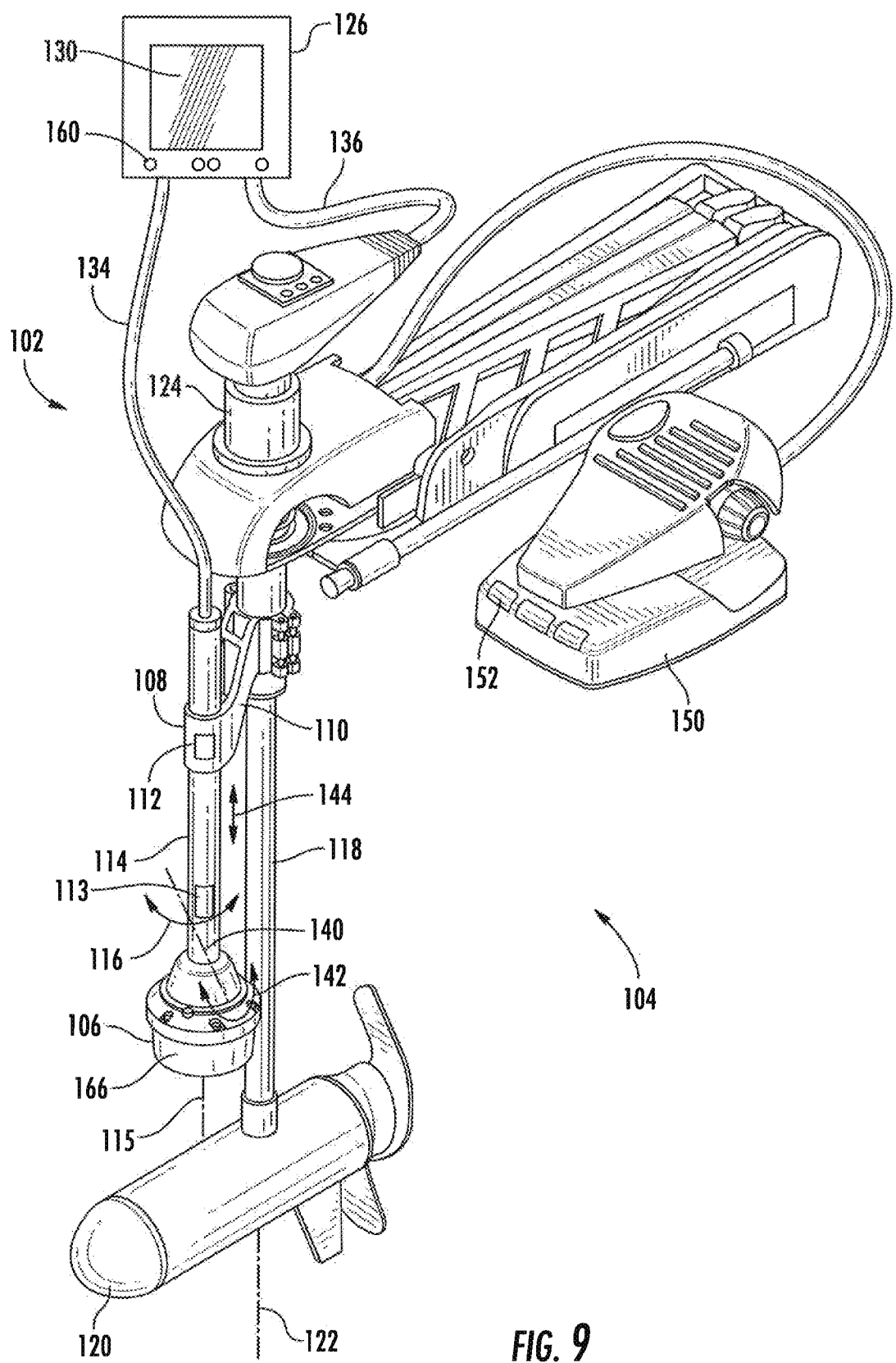
FIG. 9 is an enlarged illustration of the sonar imaging system and trolling motor of FIG. 8.
Figure 16:
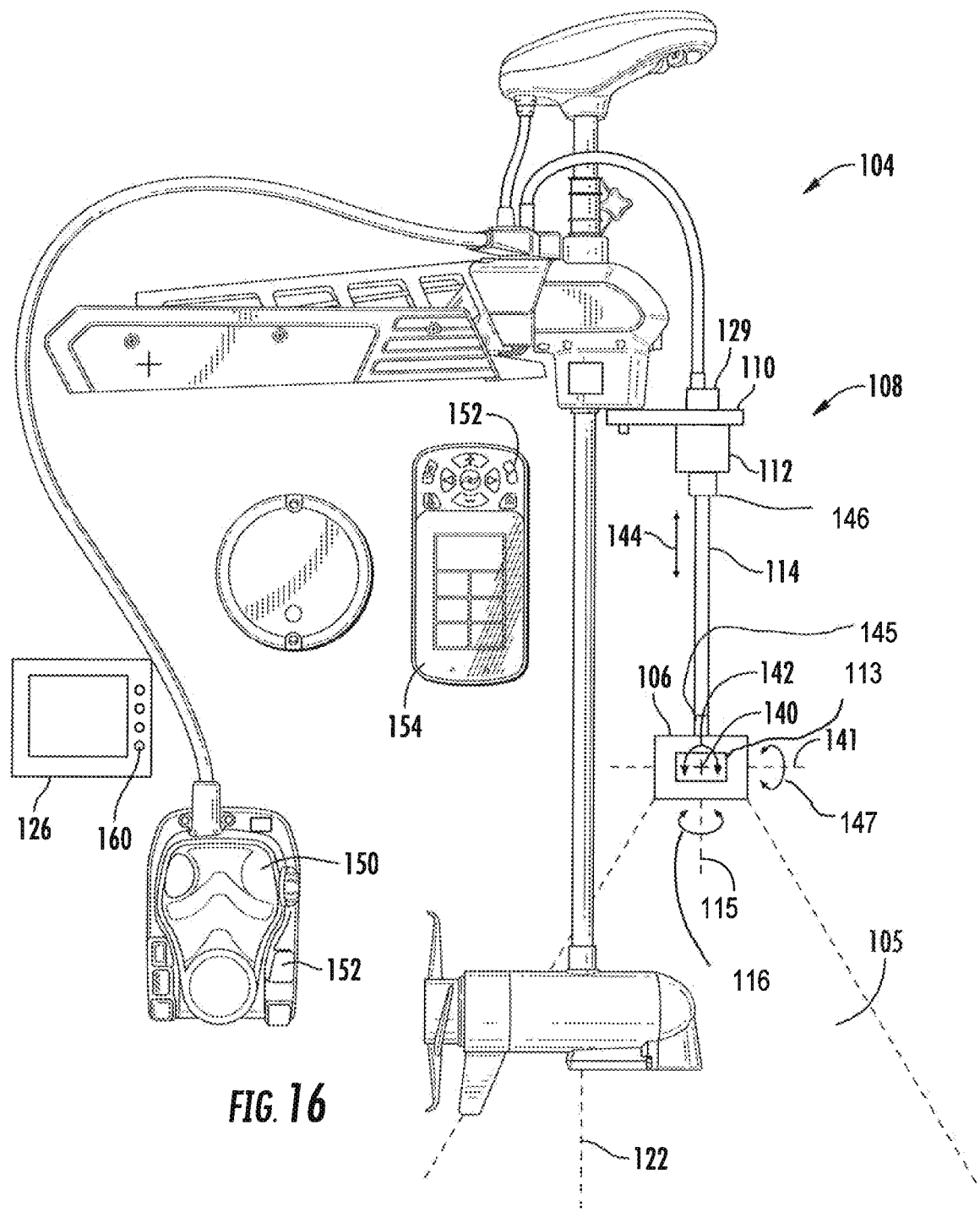
FIG. 16 illustrates an alternative sonar imaging system and trolling motor illustrating the transducer assembly having the sonar array and sonar beam thereof oriented in a downward facing orientation.
Figure 17:
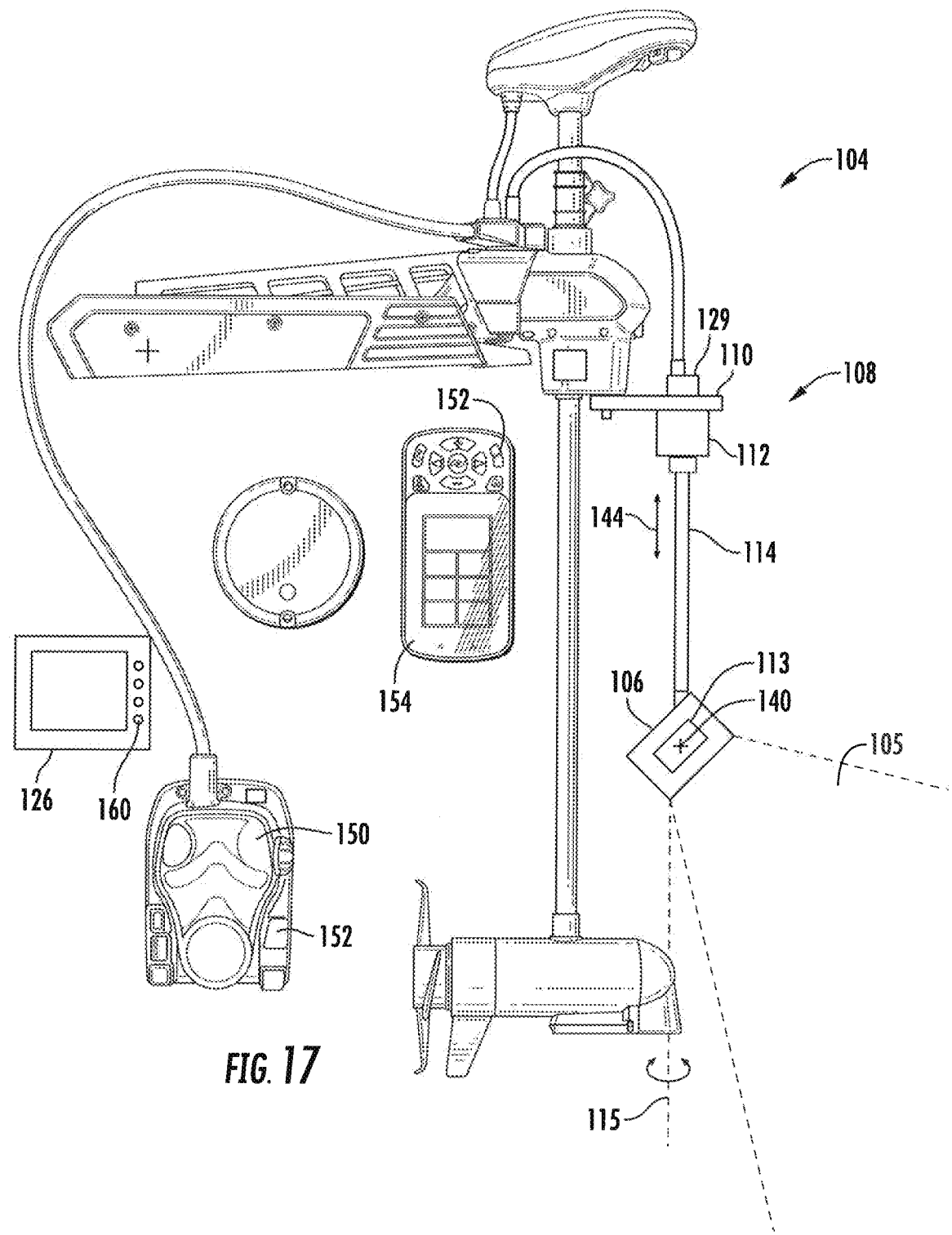
FIG. 17 illustrates the sonar imaging system of FIG. 16 with the sonar array and sonar beam thereof oriented in a outward facing orientation.
Figure 18:
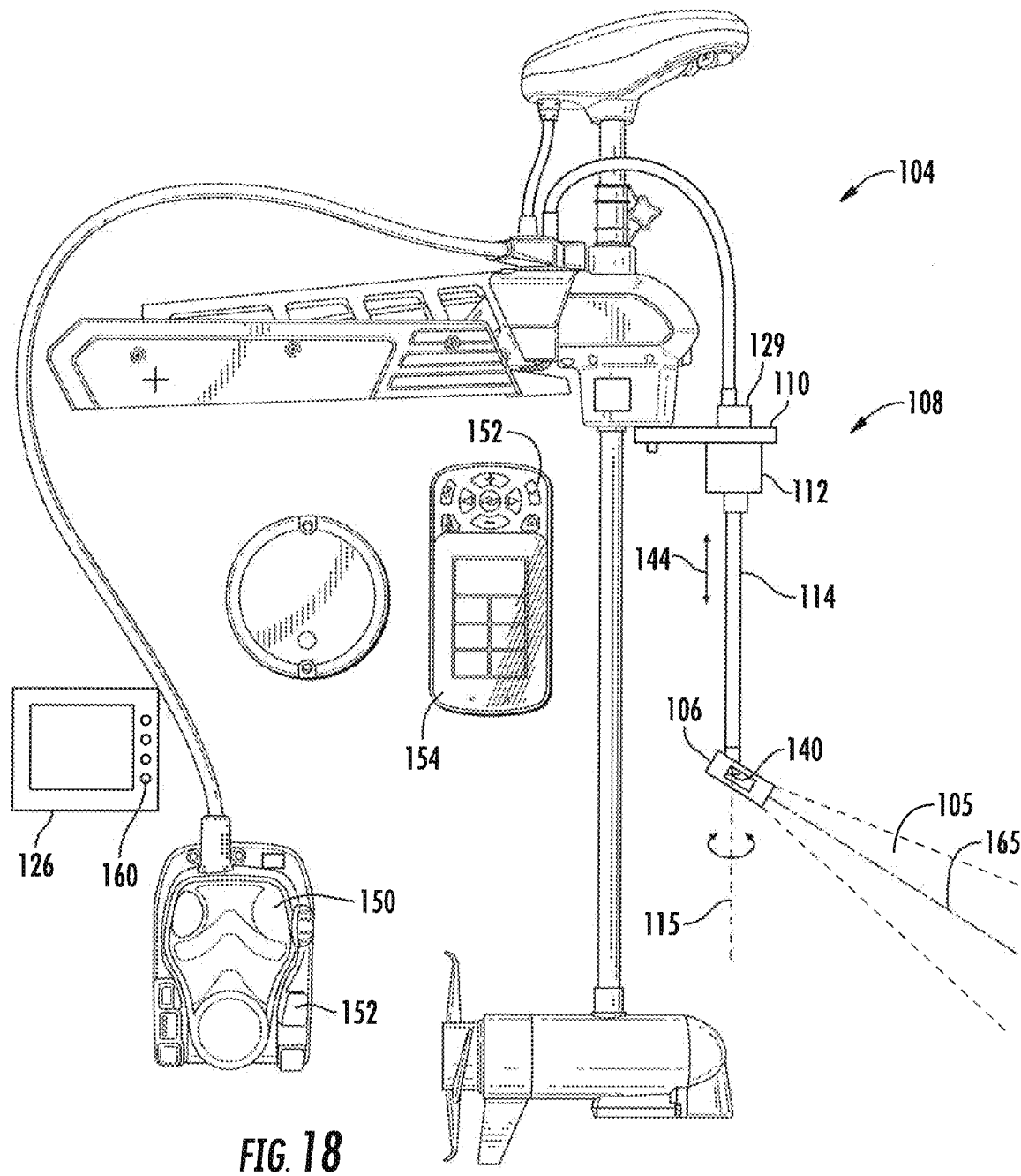
FIG. 18 illustrates the sonar imaging system of FIG. 16 with the sonar array and sonar beam thereof oriented in a landscape orientation.

FIG. 8 illustrates a portion of a watercraft 100 that includes a sonar imaging system 102 operably mounted thereto according to an example of the present disclosure. FIG. 9 is an enlarged illustration of the sonar imaging system 102 removed from the watercraft 100. In examples, the sonar imaging system 102 is configured to maintain a sonar beam pointed at an intended target even when the watercraft 100 is moving relative to the target. FIGS. 16-18 illustrate a slightly modified system.

Figure 1:
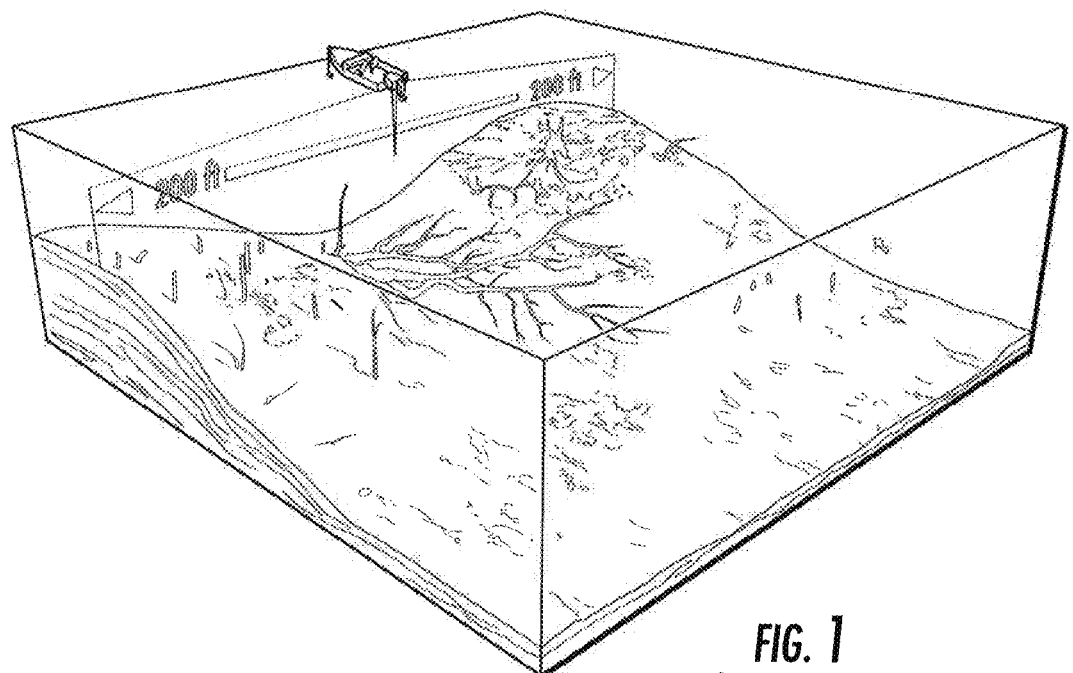
FIG. 1 is a visual depiction of a Side Imaging® sonar system provided by the assignee of the present application.
Figure 2:
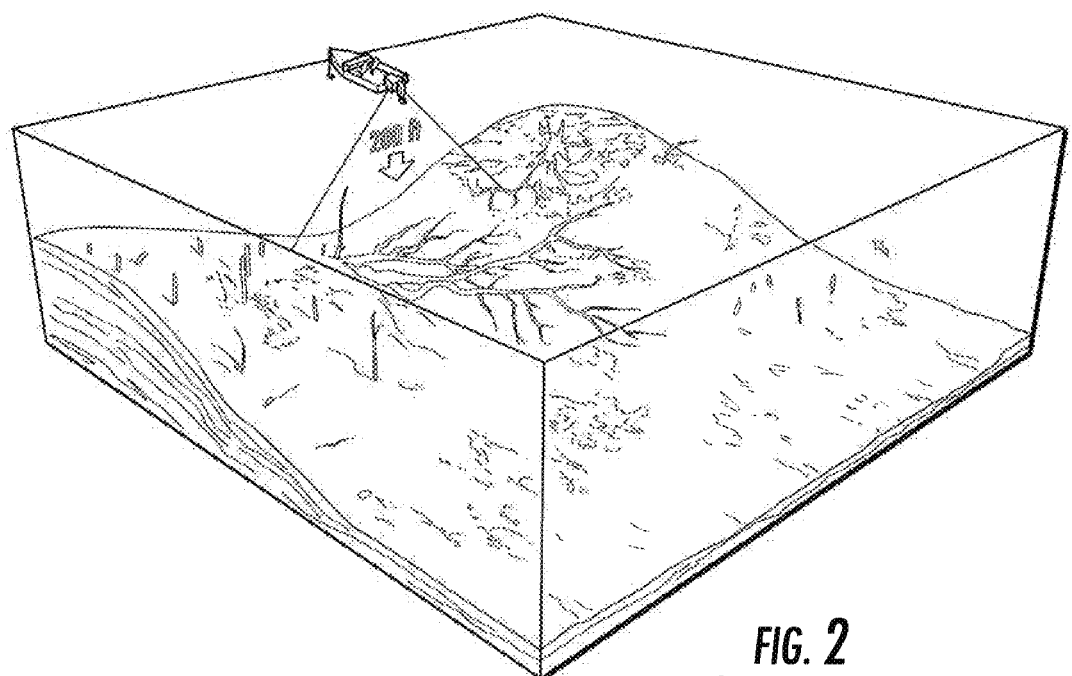
FIG. 2 is a is a visual depiction of a Down Imaging® sonar system provided by the assignee of the present application.
Figure 3:
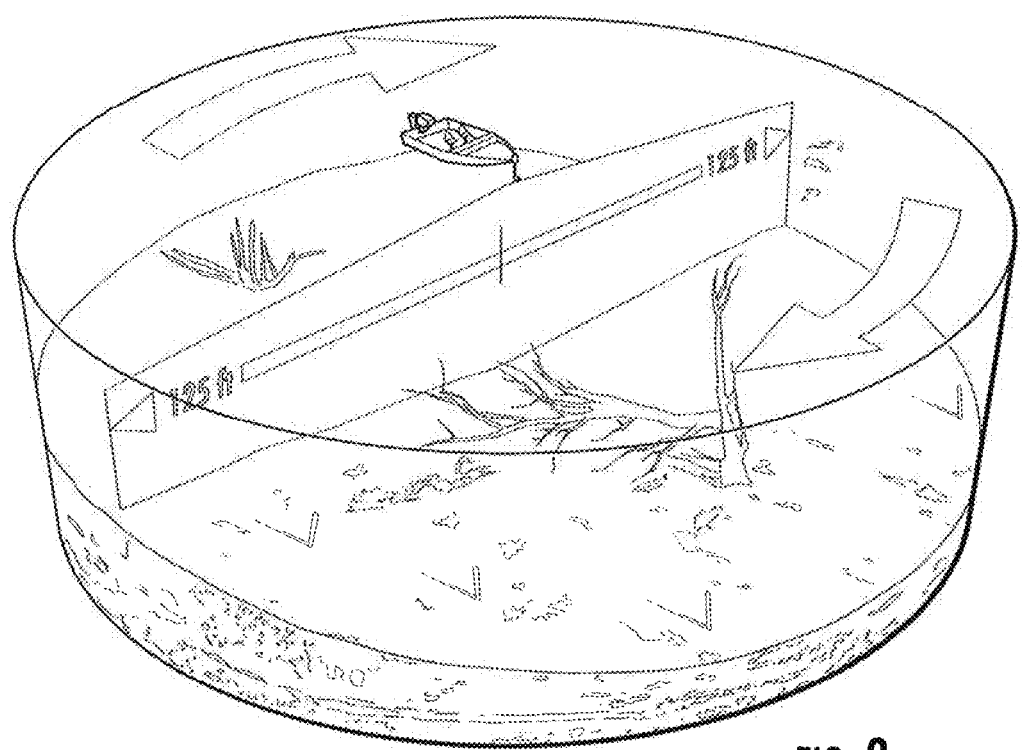
FIG. 3 is a is a visual depiction of a 360 Imaging sonar system provided by the assignee of the present application.
Figure 4:
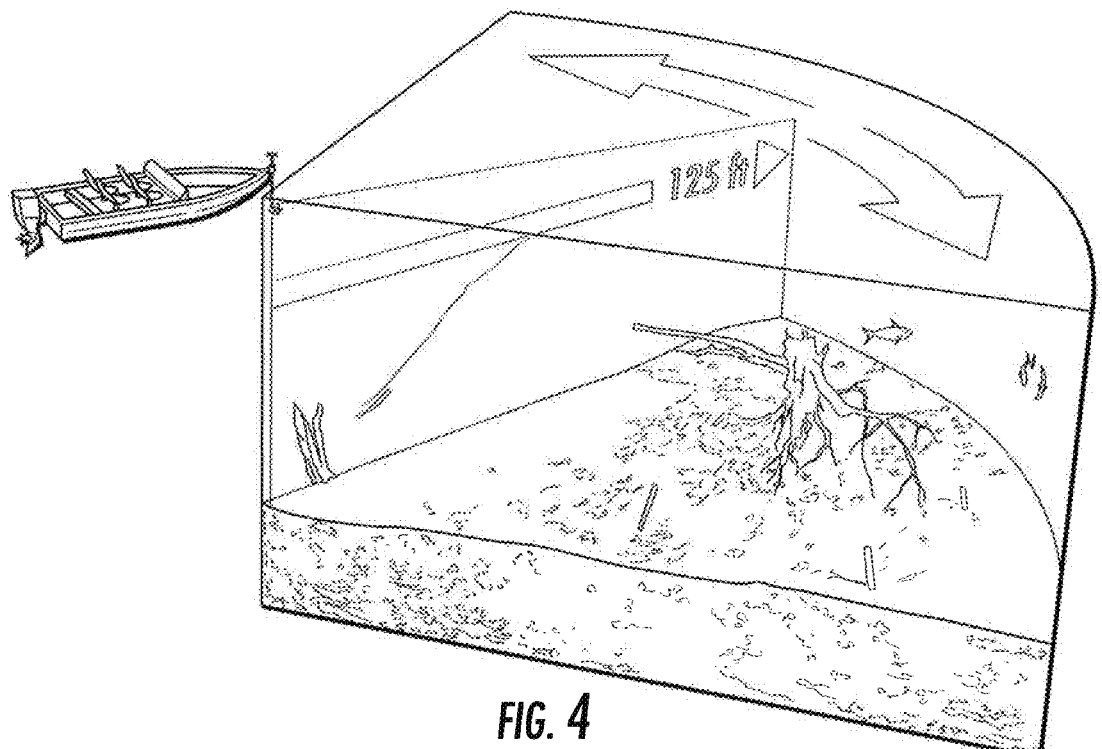
FIG. 4 is a visual depiction of a sector scan feature available with the system of FIG. 3.
Figure 5:
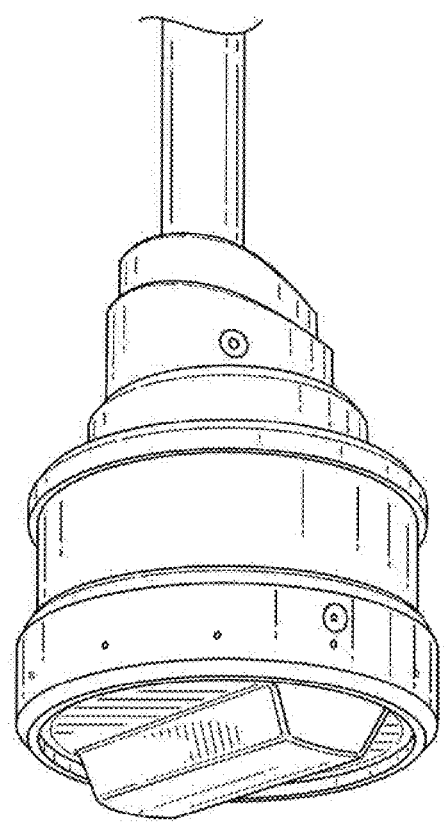
FIG. 5 is an image of a sonar transducer assembly.
Figure 6:
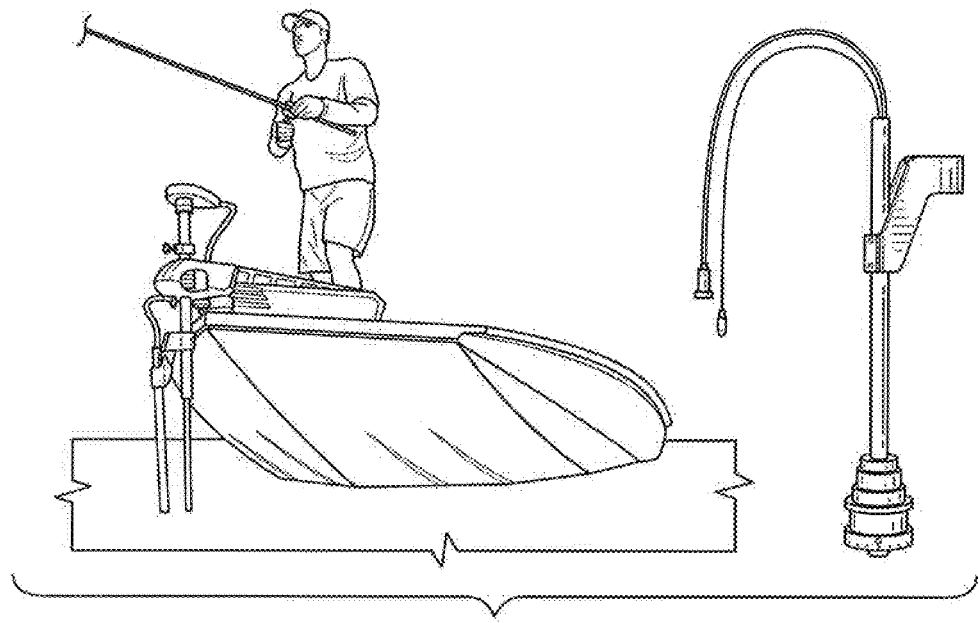
FIG. 6 is an image of a 360 degree sonar product and installation thereof on an user's trolling motor.
Figure 7:
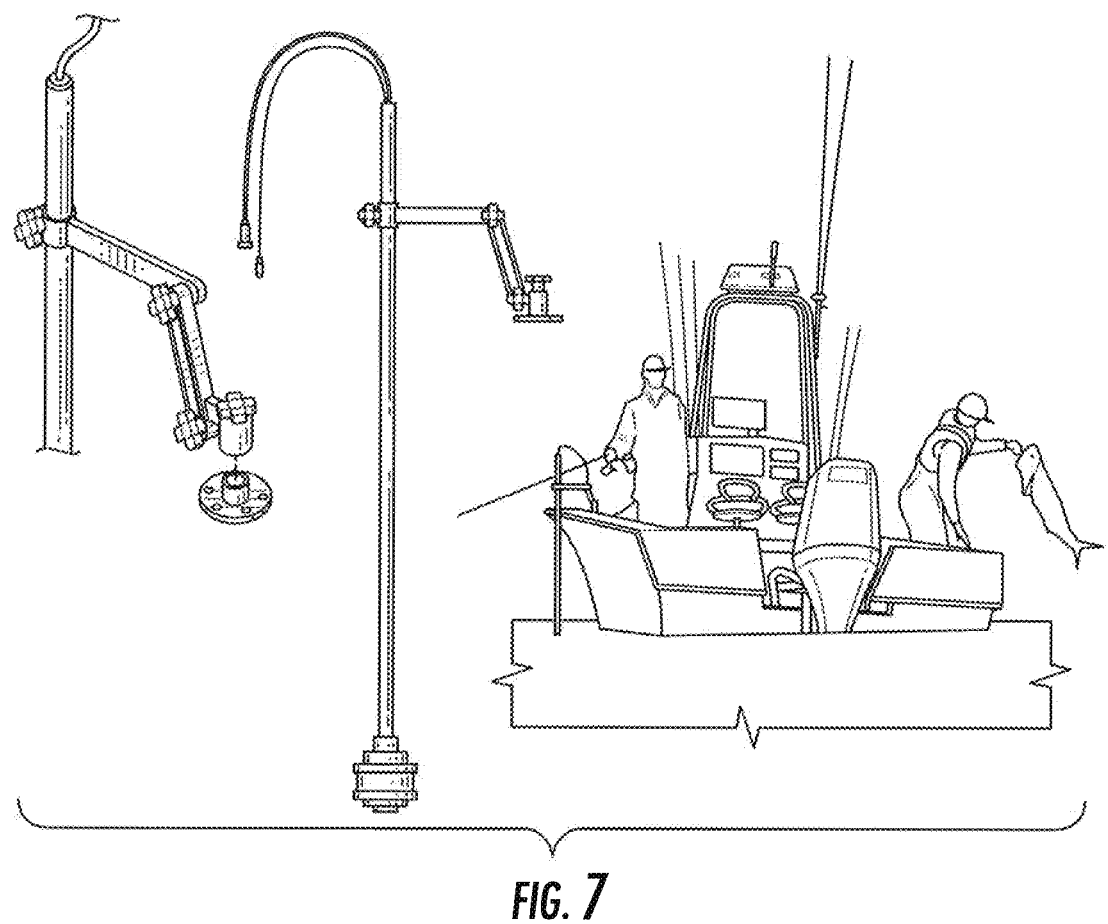
FIG. 7 is an image of a 360 degree sonar product and installation thereof on an user's boat.

In this example, the sonar imaging system 102 is associated with and mounted to a retractable and deployable trolling motor 104. As such, when the trolling motor 104 is deployed and stowed, a transducer assembly 106 of the system 102 is similarly deployed and stowed. However, other examples can be independent of a trolling motor 104. For example, the sonar imaging system 102 could use a mounting arrangement that mounts to the watercraft 100 independent of the trolling motor and use a mounting arrangement similar to that in FIG. 7.

In this example, the sonar imaging system 102 includes a transducer assembly 106 that includes a sonar array configured for generating sonar data for use in generating sonar images of objects under water. The sonar array generates at least one sonar beam, see for example sonar beam 105 illustrated schematically in FIGS. 16-18. The sonar data generated from the sonar beam 105 can then be used to generate an image representative of the structure below the surface of the water.

The transducer assembly 106 is carried on an electro-mechanical assembly 108 of a sonar target locking system of the sonar imaging system 102 that can maintain the transducer assembly 106, and particularly the sonar beam and sonar array thereof, pointed at a position of a desired target (also referred to as a user set target) regardless of the movement of the watercraft 100 due to wind, waves, current, or as a result of controlled steering of the watercraft 100. A positioning system of the sonar target locking system is configured to identify a position of the user set target and to determine changes in the position of the sonar array relative to the position of the user set target.

Identification of the user set target may be simply receipt of coordinates within a GPS coordinate system, such as a way point or receipt of a heading and a distance from the transducer assembly 106.

The electro-mechanical assembly 108 can be steered electrically to maintain the transducer assembly 106 pointing at the identified position of the desired target.

The electro-mechanical assembly 108 includes a mount 110 for attachment to the trolling motor 104 (or watercraft 100 in non-trolling motor examples). A motor 112 rotatably drives the transducer assembly 106 about axis 115 so as to adjust the direction the transducer assembly 106 is oriented, e.g. pointed/aimed, relative to the watercraft 100. As such, upon movement of the watercraft 100, controlling of the electro-mechanical assembly 108 maintains the transducer assembly 106 and particularly the sonar array pointing at the position of the desired target.

In this example, motor 112 can rotate shaft 114 about axis 115 as illustrated by arrow 116, which will rotate the entire transducer assembly 106 relative to watercraft 100 and particularly relative to mount 110.

In other examples, the electro-mechanical assembly 108 could be the trolling motor 104. For example, with reference to the trolling motor 104 illustrated in FIG. 9, the trolling motor 104 includes a motor 124 that will electrically rotate shaft 118 and the propulsion unit in the form of motor 120 about axis 122. In such an example, the transducer assembly 106 could be operably attached to shaft 118. The motor 124 and rotational capabilities of the trolling motor 104 could be used to point and orient the transducer assembly 106. In such an example, the system could be further configured to permit motion about axes 140, 141 illustrated in FIG. 16.

Figure 10:
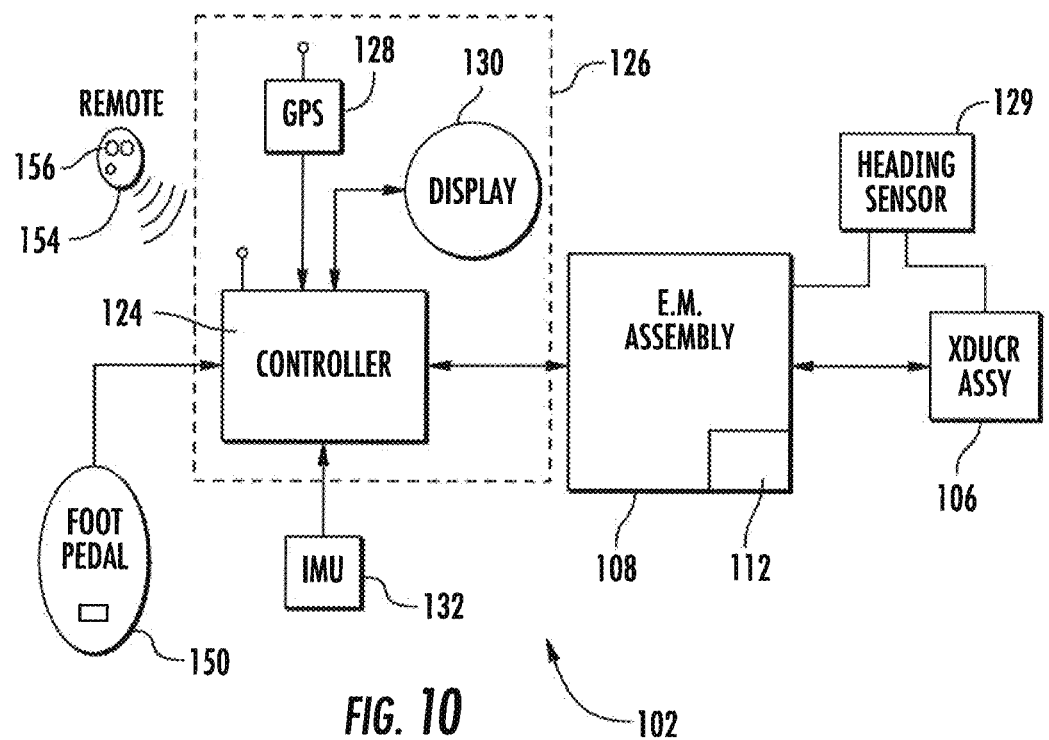
FIG. 10 is a block diagram illustrating elements of an example of the sonar imaging system of FIG. 9.

With additional reference to FIG. 10, an example of the sonar imaging system 102 is illustrated schematically. The sonar imaging system 102 includes a controller 124 operably coupled to the electro-mechanical assembly 108 for controlling, among other things, the actuators of the system, e.g. motors 112, 113, 145, 146 of FIG. 16. The controller 124 is operably coupled to the actuators to provide control signals to the motors to control motion of the transducer assembly 106, such as to rotate the shaft 114 and the transducer assembly 106 about axis 115 and to provide control signals to motor 113 to control motion of the transducer assembly 106 about axis 140 for aiming of the transducer assembly 106. Additionally, control signals can be provided to motors 145, 146 for further manipulation of the position of the transducer assembly 106.

In this example, the controller 124 is part of a fish finder control head 126 that also includes a GPS unit 128 and a display 130. However, the controller 124 and GPS unit could be external to and/or remote from the fish finder control head 126 and could be a separate component. Further, the controller 124 and GPS unit may be part of the electro-mechanical assembly 108 or the transducer assembly 106. The controller 124 could communicate with a separate fish finder control head 126 over a network. An Inertial Measurement Unit 132 (IMU 132) is also connected to the controller 124. The IMU 132 can sense changes in the orientation of the transducer assembly 106 relative to the watercraft 100 or mount 110 of the system. The IMU can also communicate over the network. The IMU may be mounted to or part of the transducer assembly.

A heading sensor 129 may be part of or communicate with the GPS unit 128 to provide heading information of the transducer assembly 106. In one example, the heading sensor 129 may be rotationally carried with shaft 114 and/or transducer assembly 106. Such an arrangement is illustrated in FIGS. 16-18. This rotation can provide information to the system as to the heading/orientation of the sonar beam 105 relative to the mount 110 and/or within the coordinate system of the GPS unit 128. As such, when shaft 114 and/or transducer assembly 106 rotates about axis 115, these changes in orientation can be sensed by rotation of heading sensor 129 and used to more accurately aim the beam 105 of the transducer assembly. Further, using the heading sensor 129 allows for accurate orientation and changes in orientation of the sonar beam within the coordinate system used by the GPS unit 128 can be obtained.

Fish finder control head 126 is illustrated in FIGS. 8 and 9 connected to the electro-mechanical assembly 108 as well as the trolling motor 104 by wires 134, 136. However, in other embodiments, the fish finder control head 126 could be connected to the electro-mechanical assembly 108 and/or the trolling motor 104 wirelessly. In some examples, the fish finder control head 126 need not be connected to the trolling motor 104.

Typically, the fish finder control head 126 will also be operably coupled to the transducer assembly 106 to process the sonar information gathered by the sonar array of the transducer assembly 106. Either of wires 134, 136 could be used to communicate this information or a separate wire could be used for this specific information. Further, this information could be communicated wirelessly. The same controller 124 for controlling motor 112 could be used for processing the sonar information or a separate controller could be used for that processing.

In some examples, wires 134, 136 provide Ethernet communication between the various connected devices. While wires 134, 136 illustrate direct communications, Ethernet boxes or other intervening structure such as other control heads could be incorporated in the system. Further yet, communications can occur using the wiring for transmitting the sonar data between the sonar array and the fish finder control head 126.

The controller 124 receives inputs from the positioning system to identify the position of the user set target and to determine changes in the position of the sonar array relative to the position of the user set target. As may be seen in FIG. 10, the controller 124 receives inputs from the IMU 132 and the GPS unit 128. The controller 124 may also receive inputs from heading sensor 129 operably mounted to the shaft 114 and/or transducer assembly 106. One or more of the IMU 132, heading sensor 129, and the GPS unit 128 may be or may be part of the positioning system that can identify the position of the identified target (also referred to herein as the "desired target" or "user set target") and to determine changes in the position of the sonar array relative to the identified target. A change in position of the sonar array includes a change in orientation. The controller 124 uses these inputs to control the electromechanical assembly 108 to control positioning of the transducer assembly 106 and the corresponding sonar array so as to maintain the proper orientation of the transducer assembly 106 and the sonar array thereof.

Encoders, accelerometers, and other means for determining changes in position of the transducer assembly 106 may be incorporated into or provide the positioning system.

In some instances, the positioning system will use changes in position of the watercraft relative to the user set target to determine the changes in position of the transducer assembly relative to the user set target.

In one example, a user would identify the desired target, and then using the GPS inputs, heading sensor inputs and/or IMU inputs, the controller 124 would create control signals to control the electro-mechanical assembly 108 to continue to aim the transducer assembly 106 and the sonar beam 105 thereof at the desired target as the watercraft 100 and the attached components of the sonar imaging system 102 move relative to the identified target.

The positioning system can include sensors provided by one or more of the GPS unit, heading sensor, IMU, etc. that can provide heading, velocity, acceleration, GPS coordinates and other information related to the position and motion of the transducer assembly 106. Again, these could be direct changes in position within the GPS coordinate system, changes in position of a watercraft to which it is mounted and other processes for determining changes in position of the transducer assembly 106 relative to the user set target.

This information is used to determine the changes in position of the transducer assembly 106 so that the controller 124 can properly control the electro-mechanical assembly 108 to properly maintain the transducer assembly and beam 105 aimed at the position of the desired target.

In a preferred example, the actuators such as motor 112, 113, 145, 146 are servo motors.

While motor 112 adjusts the position of the transducer assembly 106 in one dimension about axis 115, the electro-mechanical assembly 108 can be configured to position the transducer assembly in multiple dimensions using the other motors 113, 145, 146.

For example, and with reference to FIGS. 9 and 16-18, the electro-mechanical assembly 108 can be configured to and include actuators such as electric motors to manipulate the position of the transducer assembly 106 about axis 140 as illustrated by arrow 142 using motor 113, vertically such as along axis 115 by motor 146 as illustrated by arrow 144, about axis 141 by motor 145 as illustrated by arrow 147, and about axis 115 by motor 112 as illustrated by arrow 116.

In one example, motor 112 rotates the shaft 114 to rotate the transducer assembly 106 about axis 115.

In one example, motor 113 is operably positioned between the shaft 114 and the transducer assembly 106 to rotate the transducer assembly 106 about axis 140.

In an example, actuator 113, typically an electric motor, is provided that allows the electro-mechanical assembly 108 to adjust the orientation of the transducer assembly 106 and the sonar beam 105 about axis 140 and illustrated by arrow 142 without requiring the transducer assembly 106 to be stowed. For example, this would allow the user to change the orientation between an orientation where the sonar array and sonar beam 105 are more outward facing (see e.g. FIG. 17) than downward facing and an orientation where the sonar array and sonar beam 105 is more downward facing (see e.g. FIG. 16) than outward facing as well as orientations therebetween. Thus, if the user wants to switch between targeting a location away from the watercraft and a location nearer and below the watercraft, the user can simply reorient the transducer assembly 106 by providing input signals to actuator 113.

In one example, the electro-mechanical assembly 108 may include one or more actuators that allows for adjusting the orientation of the transducer assembly into a landscape orientation (see e.g. FIG. 18). In FIGS. 16 and 17, a centerline plane of the sonar beam 105 is generally oriented parallel to a vertical plane that is also parallel to the page. In these orientations, the sonar beam 105 has a greater dimension parallel to the page than perpendicular to the page.

In FIG. 18, the orientation of the transducer assembly 106 has been manipulated so that the centerline plane 165 of the sonar beam 105 extends perpendicular to the page and is illustrated by a dash-dot line located between the dashed lines indicating the edges of the sonar beam 105. Further, the centerline plane 165 extends at a non-perpendicular angle to vertical. This angle can be adjusted, such as depending on the depth of the desired area to be scanned or the desired target. Thus, the sonar beam 105 is oriented downward and outward/forward in FIG. 18.

This orientation could be established by rotating the transducer assembly 106 about an axis parallel to axis 115 while also rotating the transducer assembly 106 about an axis parallel to either axis 140 or 141. More particularly, starting at the position illustrated in FIG. 16, the transducer assembly could be rotated about axis 115 or an axis parallel to axis 115. Thereafter, the transducer assembly could be rotated about axis 140. This would result in the orientation shown in FIG. 18.

In one example, these changes in orientation could occur automatically due to changes in conditions. One such change in condition could be a change in depth. For example, as the user transitions from shallow water where a more outward facing orientation (FIG. 17) is used to deeper water where a more downward facing orientation (FIG. 16) is used, the system could automatically transition from an outward facing orientation (FIG. 17) to a more downward facing orientation (FIG. 16) by pivoting the transducer assembly 106 about axis 140 using actuator 113.

The depth information could be taken from sonar data gathered by the transducer assembly 106 or other transducer assembly on the network. Such depth information would be substantially real time. Additionally and/or alternatively, the depth information could be taken from contour information provided by a depth chart. Further yet, the user could input depth information such as signals indicating increased or reduced depth.

The depth information need not be the depth to the bottom of the body of water. Instead, the relevant depth information could be to a desired target suspended off the bottom of the body of water. For example, if a user identifies a target such as a brush pile and identifies that depth dimension to the system, such as using an input on a fish finder control head, the user could identify a portion of the brush pile that is suspended above the bottom of the body of water and the system could use that depth information to adjust the orientation of transducer assembly 106, such as between being more outward facing or more downward facing. The user could identify this location using the fish finder control head and marking a location on the image displayed on the fish finder control head.

In some implementations, the system can automatically adjust the orientation based on changes in the distance of the watercraft 100 and/or transducer assembly 106 from the desired target. For example, as the watercraft 100 and transducer assembly 106 approach a target, the system could transition towards a more downward facing orientation (FIG. 16) than a more outward facing orientation (FIG. 17). It should be noted that outward facing may often be referred to as forward facing, even when the sonar beam 105 is oriented to aim laterally outward relative to a watercraft.

In some examples, the system can be preprogrammed to automatically adjust the forward-downward-landscape orientation upon deployment of the transducer assembly.

The transducer assembly 106 could be pointed towards a target using at least two different methods.

Figure 11:
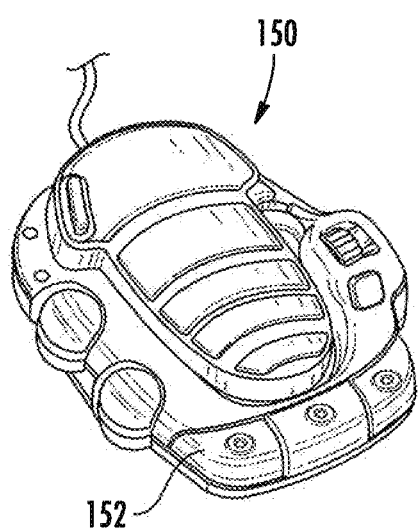
FIG. 11 is an image of a remote foot control for use with an example of the present disclosure.

In a first method, foot control using a foot pedal 150, such as shown in FIG. 9 or 11, is used to steer the transducer assembly 106 to point at the desired target. Once the transducer assembly 106 has been positioned as desired, the user may then press button 152 on the foot pedal 150 or a button 156 on remote 154 (see FIG. 10 or 16-18), telling the sonar imaging system 102 to keep the transducer assembly 106 pointed in the direction of the target. The pressing of the button 152, 156 can be considered a structure lock command. Further yet, the user could generate the input signal using a fish finder control head.

Notably, foot pedal 150 may be a standalone foot pedal dedicated to the sonar imaging system 102 or could be a foot pedal of the trolling motor 104 as illustrated in FIG. 9. In one instance, the control of the trolling motor 104 using foot pedal 150 could be deactivated so that use of foot pedal 150 only controls steering of the transducer assembly 106.

Further, remote 154 could be a standalone remote or incorporated into other remotes used on the watercraft such as a remote that may be used for wirelessly controlling operation of the trolling motor 104 or other components on the boat such as shallow water anchors.

In a second method, the structure lock command is input by the user using the fish finder control head 126. For example, the user could set or otherwise identify a specific waypoint within the coordinate system of the GPS unit using the fish finder control head 126. In some instances, this could be done using buttons 160 or using touch screen capabilities of the display 130 of the fish finder control head 126.

In one example, this is done by setting a specific waypoint that may be used similar to Spot Lock and i-Pilot features currently employed for trolling motor control of the user's watercraft via a Minn Kota trolling motor.

Embodiments of the present invention provide a system and method that allow an user to mark a waypoint on an underwater target such as a rock, tree, or other under water structure and activate the structure lock command, which will cause the electro-mechanical assembly 108 to automatically point the transducer assembly 106 at this target regardless of the watercraft's movement/direction, drift.

In one example, the sonar imaging system 102 and method work in conjunction with the trolling motor 104 as it automatically positions the watercraft 100 around a fishing target while the transducer assembly 106 remains locked on the user set target for hands and foot free fishing. More particularly, the trolling motor 104 could be controlled, for example, to traverse back and forth adjacent a target, completely around or partially around a target, such as by way of i-Pilot features, while the transducer assembly 106 is maintained aimed at the desired target using the sonar target lock system.

In one example, the transducer assembly 106 can be a sweeping transducer that is or is similar to the 360 Imaging products outlined above. A sector scan control (e.g. control that causes the sonar array to oscillate back and forth to sweep less than full 360 degrees) of the transducer assembly 106 can be controlled to accomplish the structure lock features. For example, the electro-mechanical assembly of the sweeping transducer that drives the sweeping motion can provide the requisite positioning to maintain the transducer assembly 106 pointed at the target. Here, as the transducer assembly 106 moves relative to the desired target due to changes in position of the watercraft 100, the control signal controlling the oscillating sweeping motion of the transducer assembly 106 is updated accordingly to keep the desired target within the sweep area.

As such, maintaining the sonar beam generated by the sonar array pointed at a desired target includes pointing the sector scan area of a sweeping transducer at a desired target, even though the sonar array itself may vary its orientation and pointing relative to the desired target to effectuate the desired sweeping. In a preferred implementation, the identified target would remain proximate the center of the sweep area, but it need not do so in all examples.

A predefined sweep angle may be provided, and the sonar array is swept back and forth within the predefined sweep angle. In one example, the predefined sweep angle is 120 degrees. While sweeping would typically be employed by rotating about axis 115, in other examples, the system could sweep vertically such as by rotating about axis 140. This could be particularly useful when using the landscape orientation of FIG. 18.

In one example, the predefined sweep angle is user definable. In such an arrangement, the electro-mechanical assembly 108 attached to the transducer assembly 106 oscillates between rotating the sonar array in a first angular direction and a second opposite angular direction. As the watercraft 100 moves relative to the desired target, in a preferred implementation, the electro-mechanical assembly 108 adjusts the sweeping of the sonar array such that the desired target remains generally centered within the desired sector scan area.

Alternatively, the user may use a sector offset where the user adjusts the location of the desired target within the desired sector scan area. For instance, a desired target may have a dropoff or flowing current to one side. If the user only wants to see the target and the area with the dropoff or flowing current, the user could offset the desired target from the center of the desired sector scan area, rather than creating a new desired target location. This would move the desired target to one side of the sector scan area and as the watercraft moves relative to the desired target, it would remain proximate that side of the sector scan area.

The user can adjust the offset by using predetermined incremental adjustments which could be percentages of the angle of the desired sector scan area (e.g. 5% of the sector scan area), predefined degrees (e.g. 5-degree adjustments), directly inputting the offset amount, using a touch screen of a fish finder or other unit to manually move the sector scan area relative to the desired target, etc.

In addition to using the actual sector scan control of the transducer assembly 106 of a sweeping transducer, other arrangements could use a separate motor such as motor 112 to simply rotate the entire sonar array of the transducer assembly about axis 106. For example, if transducer assembly 106 is a sweeping style transducer that has a motor within the transducer pod 166 thereof, motor 112 could be used to maintain the transducer pod 166 pointed at the target while the motor controlling the sweeping motion of the sonar array of the transducer assembly is controlled under normal sector scan control. This would separate the control of the sweeping motion for the sector scan operation from the control of the positioning of the transducer assembly 106 by motor 112 for the structure lock operation.

Again, communications to control either or both of the sector scan control or the control of motor 112 can occur using Ethernet. In other examples, the communication can occur via wireless communications technology. Further yet, communications can occur using the wiring for transmitting the sonar data between the sonar array and the fish finder control head 126.

In one example, the user may put the system into a sweeping mode where the sonar array and the sonar beam oscillate back and forth to sweep a desired sector scan area. When the user does this, the system can be configured to automatically adjust the orientation of the transducer assembly 106. For example, the system could change from the more downward facing orientation of FIG. 16 to a more outward facing orientation of FIG. 17.

In one example, upon entering a sweep mode, the system could change from the orientations of the sonar beam 105 illustrated in FIGS. 16 and 17 where the sonar beam 105 is oriented generally parallel to a vertical plane to the orientation of FIG. 18 where the sonar beam 105 is oriented in the landscape orientation, e.g. where the sonar beam 105 is oriented generally parallel to a plane that is orthogonal to the vertical plane. Typically, this would also be angled in a non-perpendicular orientation relative to vertical.

In one example where the system automatically transitions to the forward (FIG. 17) or landscape (FIG. 18) orientations, the angle relative to vertical could be dependent upon or compensated by a depth value. This depth value could be taken from current/recent sonar data or by contour data taken from a depth map.

Figure 12:
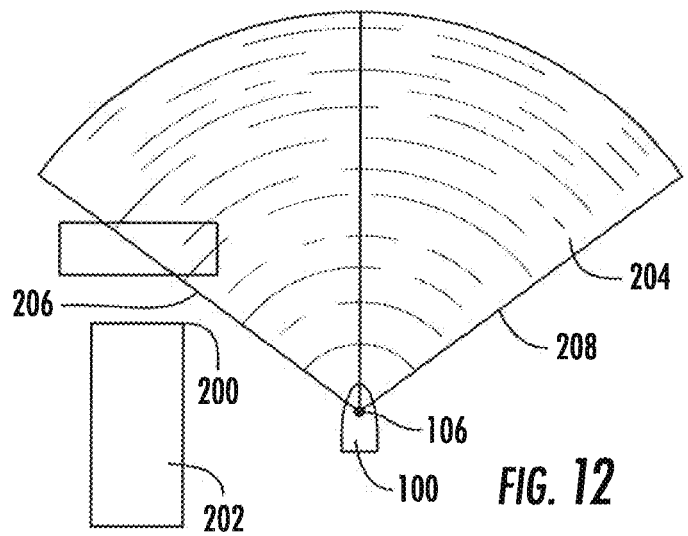
FIG. 12 is schematic illustration of a watercraft including a sonar imaging system according to an example of the disclosure with a desired target out of the scanning area of the transducer assembly of the sonar imaging system.
Figure 13:
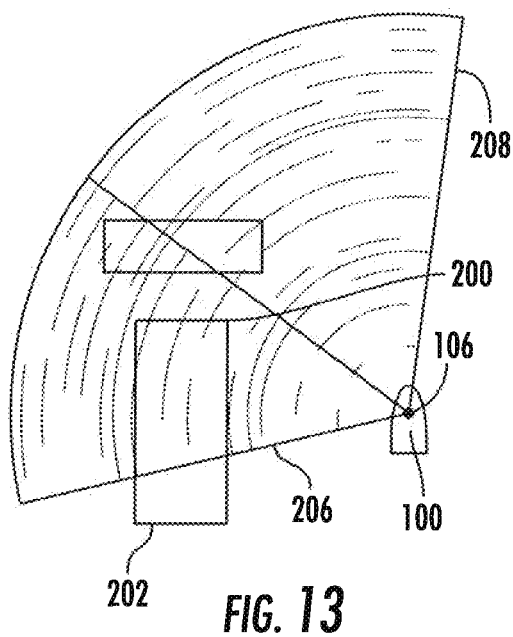
FIG. 13 is a schematic illustration with the watercraft of FIG. 12 in a same position and orientation relative to the desired target, but with the desired target within the scanning area of the transducer assembly.
Figure 14:
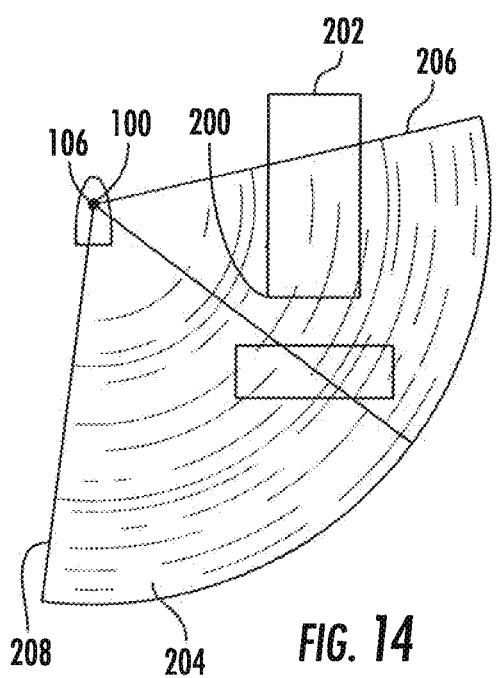
FIG. 14 is a schematic illustration with the watercraft of FIGS. 12 and 13 in a different position and orientation relative to the desired target and with the desired target remaining within the scanning area of the transducer assembly.

With reference to FIGS. 12-14, methods associated with use of a sonar target scan system and corresponding sonar imaging system 102 are described. With initial reference to FIG. 12, a user approaches a desired target 200. For example, the user may desire to fish or otherwise scan desired target 200 such as the corner of object 202. In this instance, the transducer assembly 106 is pointed forward of the watercraft 100. This is represented schematically by the scanning area 204 defined between boundary lines 206, 208.

Notably, the desired target 200 is not within the scanning area 204 of the transducer assembly 106. Here, the user can manually manipulate the position of the transducer assembly 106 such that the desired target 200 is within the scanning area 204 of the transducer assembly 106. This could be done by manually generating control signals to control motor 112, such as by way of pressing on foot pedal 150, using the handheld remote 154, or by way of manually inputting control signals into fish finder control head 126 (by way of a touch screen version of display 130 or buttons thereof).

FIG. 13 illustrates the transducer assembly 106 oriented such that it is pointed at the desired target 200. Here, the heading of the watercraft 100 has remained the same as in FIG. 12. As such, the transducer assembly 106 has been rotated approximately 45 degrees counter-clockwise from FIG. 12 to FIG. 13 to locate the desired target 200 within the scanning area 204 of the transducer assembly 106.

Once the desired target 200 is within the scanning area 204, the system can identify the position of the desired target 200. In one method, this is done by way of setting a waypoint on the position of the desired target 200. The coordinates of the desired target can be generated using the GPS unit 128 described previously.

In some embodiments, this is simply done by pressing a button on the foot pedal 150 or a button on the remote 154 or a button on the fish finder control head. In instances where a button is pressed to identify the position of the desired target 200, the system can be programmed to use the orientation of the sonar array (e.g. heading from heading sensor 129) and a distance relative to the sonar array for identifying the location of the desired target 200.

The distance could be established numerous ways. In one example, the system uses a predefined horizontal distance from the sonar array. Thus, with the orientation of the sonar array relative to the watercraft and the distance from the sonar array, a specific location can be used as the location of a desired target. The user may define this predefined distance.

In a second example, the system could use a percentage of the transmit range displayed on the users fish finder display. For example, if the user has the fish finder display configured to display a range of 100 ft in front of the sonar array, the system could use a percentage of that distance, e.g. 75%, as the distance used to determine the specific location that is used as the location of a desired target. If 75% is used, the system would use 75% of the 100 ft display distance and would use that distance plus the orientation the sonar array was pointing when the user pushed the button to set a desired target location. The system would then control the sonar array to maintain the sonar beam 105 aimed at that established location regardless of the orientation of the watercraft relative to that established location and regardless if the watercraft moves closer to or further from the established location.

In a third example, the system may analyze the sonar data when the user pressed the button to set the location of the desired target 200 to identify an object within the sonar data and use the location of the identified object (e.g. distance from the sonar array and orientation of the sonar array) as the location of the desired target 200. For instance, if the data illustrates an edge of a brush pile, rock pile or tree by way of a change in return strength, the distance to that object can be used as the location of the desired target 200.

While two-dimensional location information may be sufficient for controlling the electro-mechanical assembly 108 to control the positioning of the transducer assembly 106, it is contemplated that depth information, as discussed previously, can be used to control the orientation of the transducer assembly 106. In one example, the depth information is taken from contour information taken from a depth chart accessible by the controller of the electro-mechanical assembly.

Additionally, the system can use depth information taken from the sonar data provided by the transducer assembly 106 at the location of the desired target 200. For instance, if the user initially identifies a desired target, such as using either a waypoint or the orientation of the transducer assembly and a distance, the system can use the depth information gathered from the transducer assembly as it images the desired target and use that depth information to assist in controlling the orientation of the transducer assembly. For example, changes in depth could be used to change the vertical orientation of the sonar array.

Further yet, the depth information could be manually input by a user and/or the user can make adjustments to a predefined or sonar defined depth input.

Viewing the desired target 200 with the transducer assembly 106 assists in locking the transducer assembly 106 on the desired target 200, such as by way of setting the waypoint or identifying a specific distance from the transducer assembly 106 as illustrated on the fish finder control head 126. For example, the user can, typically, view the desired target 200 on the fish finder control head 126 and then use the fish finder control head 126 to identify the position of the desired target 200. Here also, this allows the GPS unit 128 to determine the GPS coordinates of the desired target 200.

Once the structure lock is activated, the sonar imaging system 102, particularly controller 124 thereof, will control the electro-mechanical assembly 108 to reposition the transducer assembly 106 such that the transducer assembly remains pointed at the position of the desired target 200, regardless of the watercraft orientation, drift, or other movement of the watercraft 100 due to wind, waves, current, or as a result of steering control as the watercraft 100 is moved around, toward, or away from the desired target 200. This can be done using inputs from one or both of the GPS unit 128, heading sensor 129 or the IMU 132, which can be used to determine changes in position of the transducer assembly 106 relative to the position of the desired target 200.

FIG. 14 shows that the heading of the watercraft 100 has changed such that the watercraft 100 is no longer at a same orientation relative to the position of the desired target 200 as in FIGS. 12 and 13. However, the scanning area 204 of the transducer assembly 106 is still pointing at the desired target 202. Here, the system of the present disclosure automatically, and without manual inputs by the user, keeps the desired target 200 within the scanning area 204 of the transducer assembly 106 as the watercraft 100 transitions from the position relative to desired target 200 in FIG. 13 to the position relative to desired target 202 in FIG. 14.

While the prior example used manual inputs to initially locate the desired target 200, other examples can use automatic positioning of the transducer assembly 106 to point the transducer assembly 106 towards the desired target 200. For example, a user could identify the position of the desired target 200 by setting a waypoint using map data on the fish finder control head 126, could identify the position of the desired target 200 by setting a waypoint by directly inputting GPS coordinates into the fish finder control head 126, or could identify the position of the desired target 200 using predefined waypoints previously stored in the fish finder control head 126 that have been recalled from memory of the fish finder control head 126.

Again, once the position is identified, the system will control the electro-mechanical assembly 108 to maintain the transducer assembly 106 pointing at the position of the desired target 200.

In some examples, the structure lock feature may be activated simply by deploying the transducer assembly within the body of water. Upon deployment, the system and particularly electro-mechanical assembly 108 could automatically orient the transducer in a predetermined orientation. For example, if a known waypoint is predefined in the system, the electro-mechanical assembly 108 may immediately and automatically control the orientation of the transducer assembly 106 upon deployment of the transducer assembly 106 to aim the transducer assembly 106 at the waypoint. The predetermined orientation would be an orientation aimed at that known waypoint.

Figure 15:
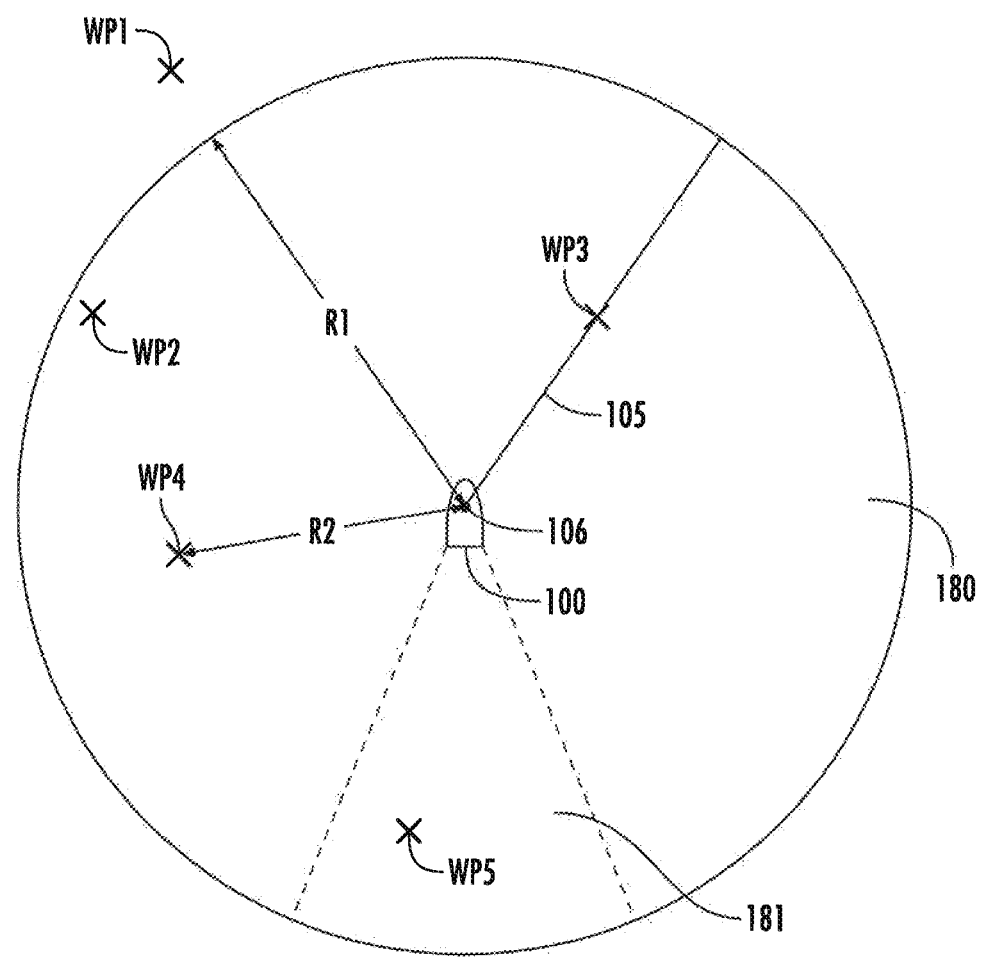
FIG. 15 is a schematic illustration of a watercraft including a sonar imaging system according to an example of the disclosure utilizing a predefined area about the boat for locating predetermined waypoints at which the system will automatically aim a sonar array of the transducer assembly upon deployment of the transducer assembly.

With reference to FIG. 15, typically, the system would only automatically control the orientation toward predefined waypoints that are within a predefined area, such as area 180. In this example, the area 180 is defined by a predefined distance R1 from the transducer assembly 106. Thus, the system could automatically orient the transducer assembly 106 to aim the sonar beam 105 at one of waypoints WP2-WP4 located within area 180. WP1 is located farther from the transducer assembly 106 than predefined distance R1 and out of area 180, and thus would not be automatically targeted. For example, the predefined distance R1 may be 200 feet. As such, only a waypoint within a radius of 200 feet from the sonar array may be used by the system to automatically orient the transducer assembly 106, such as waypoints WP2-WP4.

If multiple waypoints are located within the predefined area 180, such as waypoints WP2-WP4, the system can be setup to prioritize one waypoint over another. For example, the system could target the closest waypoint (e.g. waypoint WP3) to the transducer assembly 106, the furthest waypoint from the transducer assembly 106 (e.g. waypoint WP2), or a predefined desired distance R2 from the transducer assembly. More particularly, while the system may look for waypoints within 200 feet of the transducer array, the system could be configured to prioritize waypoints that are 30 feet from the transducer array. The prioritized distance could be in the form of a range, such as for example between 30 and 35 feet. Thus, while waypoint WP4 is not the closest waypoint to the transducer assembly 106 and is not the furthest waypoint from the transducer assembly 106 within the predefined distance R1, the system could still be programmed to automatically target waypoint WP4 if WP4 is in a predefined desired distance R2 over the other two waypoints WP2 and WP3 that are also in the predefined distance R1 from the transducer assembly 106. Thus, the hierarchy provides bounds for worst case scenarios of auto targeting a waypoint if no waypoints in the even more preferred distance are present.

Further yet, the system can be configured to define an exclusion zone 190. In the exclusion zone, the predetermined orientation will not correspond to a user set target that was created prior to deploying the electro-mechanical assembly located within the exclusion zone 190. An exclusion zone 190 is illustrated in FIG. 15 by dashed lines extending from the watercraft 100. Waypoint WP5 is located in the exclusion zone. Even though way point WP5 is located with predefined distance R1, because it is in the exclusion zone 190, the system would not automatically orient the transduce assembly 106 to aim sonar beam 105 towards WP5, even if it is otherwise the highest priority waypoint.

In one implementation, the system can automatically scan for predetermined waypoints as the watercraft moves within the body of water. If new waypoints are located within the area 180 surrounding the watercraft 100 as the watercraft moves, the system could be configured to automatically aim at the waypoint that has newly entered the area 180. For example, if watercraft 100 were moved such that waypoint WP1 was not within area 180, the system could be configured to automatically aim the transducer assembly 106 and the sonar beam 105 at that waypoint WP1. This could be useful if the user is traversing between a bunch of different desired targets. Here, the system would automatically transition to the new user set target, e.g. waypoint as it comes into the desired range.

Rather than using a specific distance of 200 feet, in some examples, the system may be limited to only waypoints that are included within the viewing area of a map displayed on a fish finder control head 126. Thus, by adjusting the zoom level of the map on the fish finder control head 126, the user automatically adjusts the maximum distance value the system will use for determining if a predefined waypoint exists at the time the transducer assembly 106 is deployed.

In an alternative implementation, the electro-mechanical assembly 108 automatically orients the transducer assembly 106 such that sonar beam 105 is aimed in a predetermined orientation relative to the centerline of the watercraft upon deployment. In one implementation, the electro-mechanical assembly 108 orients the transducer assembly 106 to a predetermined orientation such that the sonar array is facing forward relative to the watercraft and generally parallel to the center line of the watercraft.

Deployment could be automatically determined by a wet switch, a mechanical sensor such as a tilt sensor or toggle switch that is activated due to the motion of the deployment mechanism. In some examples, deployment could be established by activation of the motor of a trolling motor that is part of the network that includes the electromechanical assembly 108 and/or transducer assembly 106. For example, if the electromechanical assembly 108 is mounted to the trolling motor 104, the system would know that the transducer assembly 106 is deployed if the user begins to use the trolling motor 104.

In addition to or alternatively to using deployment of the transducer assembly 106 to automatically orient the transducer assembly 106, the system could use an input from the user to automatically orient the transducer assembly 106 to a predetermined orientation. For example, a user could push a button on foot pedal 150, remote control 154, fish finder head unit 126, a phone, or other input device of the system to automatically reorient the transducer assembly 106. For example, a user may want to reorient the transducer assembly 106 such that it is aimed forward of the watercraft. The user can simply generate the input signal by pushing one of the bottoms as identified and the system will automatically steer the transducer assembly 106 such that the beam 105 thereof remains oriented parallel to the center of the watercraft and outward facing. This could be referred to as a return to home operation.

While some actions may be automatically initiated upon deployment of the transducer assembly 106, the system may also be configured to automatically change the orientation of the transducer assembly 106 when the electro-mechanical assembly 108 is stowed. For example, the downward facing (FIG. 16) or outward facing (FIG. 17) may be more conducive to storing the transducer assembly 106 when stowed. Thus, when the user stows the electro-mechanical assembly 108 and lifts the transducer assembly 106 out of the water when it is in the landscape orientation (FIG. 18), the system can automatically reorient the transducer assembly 106 to one of the orientations or a similar orientation as to those illustrated in FIGS. 16 and 17 wherein the sonar beam 105 is oriented along a vertically oriented plane when otherwise in a deployed state. As used herein, a vertically oriented plane need not be perfectly vertical, a plane that is plus or minus 15 degrees from vertical will still be considered vertical.

As with the sector scanning available with the 360 Imaging, the angular width scanned by oscillating the transducer assembly 106 may be varied as desired to focus on one small area or to broaden the imaging to cover the structure and a wider area on either side thereof. The scanning area 204 of FIGS. 12-14 was purely schematic and used for illustrative purposes.

In one implementation of the sonar imaging system 102, the position of the transducer assembly 106 can be controlled such that the sonar beam 105 always points in the same direction as the propulsion unit, e.g. motor 120 of trolling motor 104. In this mode, the electro-mechanical assembly 108 is controlled to change the orientation of the transducer assembly 106 such that it points in the same direction as the trolling motor 104 regardless of the movement, changes in orientation or drift of the watercraft 100. Further, any change in orientation of the trolling motor 104 relates in a corresponding change in the orientation of the transducer assembly 106.

In such a mode, the foot pedal 150 or other established methods of steering the trolling motor 104 (e.g. remote control or via the fish finder control head 126) can be used to steer both the trolling motor 104 and the transducer assembly 106 at the same time.

Further, in some examples, the signals that are used to control the steering of the trolling motor 104 are used to generate new signals for controlling motor 112 of the electro-mechanical assembly 108. Alternatively, the controller 124 can use information related to the direction the trolling motor 104 is pointed to generate control signals for controlling motor 112. For example, an encoder or other mechanism can be used to provide direction information for the trolling motor.

The use of the electro-mechanical assembly 108 that can maintain the transducer assembly 106 aimed at a desired target provides advantages when using other capabilities of the trolling motor and its control system. For example, many trolling motors have Spot Lock features that allow the trolling motor to hold the watercraft generally on a desired location using things such as an IMU, heading sensor and/or GPS.

In one implementation where the transducer assembly 106 is directly mounted to the trolling motor, e.g. to the shaft of the trolling motor, the system could be configured to use both Spot Lock and target lock. In such a situation, the user would enter Spot Lock mode with the trolling motor to hold the watercraft proximate a desired location. The user would also enter target lock mode where the system maintains the transducer array directed at a desired location. The system would then use the trolling motor 104 to maintain the location of the watercraft 100 and when it is not positioning the watercraft 100, the trolling motor 104 would be rotated to orient the transducer assembly 106 at the desired target.

In such a situation, the system could be programmed to prioritize Spot Lock over target lock. As such, the priority of the positioning system of the trolling motor 104 will be to maintain watercraft position proximate the desired spot lock location. Then, when the watercraft 100 is properly positioned, the trolling motor positioning system will operate to orient the sonar array towards the position of the desired target. In such a situation, when the trolling motor positioning system is orienting the transducer assembly 106, the motor that powers the propeller of the trolling motor would typically be deactivated so as to limit the likelihood of moving the watercraft 100 off of the Spot Lock location.

Further yet, in such a situation, Spot Lock offset could still be implemented. If the user initiates an offset of the Spot Lock location from the initial Spot Lock location to move the position of the watercraft, this action would take priority to move the watercraft to the new desired Spot Lock location. Thereafter, once the watercraft reaches the new offset location, the system would revert to orienting the transducer assembly so that the sonar array is directed towards the desired target. Also, the system would continue to monitor the position of the watercraft relative to the new desired Spot Lock location and, if necessary, switch back to controlling the position of the watercraft to maintain the watercraft proximate the new desired Spot Lock location.

In another configuration, the system may be configured to provide spot lock with the trolling motor to maintain the watercraft proximate a user set watercraft location. When in this mode, the foot pedal 150 may be deactivated from the trolling motor 104 and be activated to the electro-mechanical assembly 108. As such, the user can use the foot pedal 150 that otherwise controls the orientation of the trolling motor to steer the electro-mechanical assembly 108 without steering the propulsion unit of the trolling motor 104. The other steering devices such as a remote or a fish finder control head can be used in this mode to steer the electro-mechanical assembly 108 without steering the trolling motor 104.

The system can be configured to provide target lock offset. Here, a user can have the system automatically change the position of the user set target at which the sonar beam 105 is aimed. With such a feature, the use could manually set an offset distance that the position of the user set target is moved. For example, each time the user requests an offset, the system will move the position of the user set target a predetermined amount or user input amount. This can be done by pressing a button on the foot pedal 150, a remote control 154, a fish finder control head 126 or other input device in communication with controller 124. Typically, the direction the offset occurs is predefined. Most typically, the distance will be along the centerline of the sonar beam 105 at the time the offset command is initiated.

In some implementations, the system and particularly controller 124 can be configured to operate in a continuous target lock mode. In such a mode, when the system is in a target lock mode where the system is controlling the electro-mechanical assembly 108 to maintain the sonar array and sonar beam 105 aimed at a user set target and then the user directly steers the transducer assembly 106 via manual inputs into the system, such as by way of a foot pedal of a trolling motor, a foot pedal that is independent of the trolling motor control, a remote control, a fish finder control head, etc., the system remains in target lock mode when the user discontinues manually steering.

Notably, the manual inputs may be provided to the controller 124 which controls the electro-mechanical assembly 108 and the manual inputs override the target lock control provided by the controller 124 such that during manual steering, the controller 124 does not try to continually aim the transducer array at the position of a user set target.

In one implementation, when a user manually steers the system to control the positioning of the transducer assembly 106 using the electro-mechanical assembly 108, the system disengages from target lock mode altogether. Once the user discontinues manual steering, the system discontinues automatically steering the transducer assembly 106.

In another implementation, when the user discontinues manual steering, the system controls the electro-mechanical assembly 108 to steer the transducer assembly 106 to return to being aimed at the user set target that the transducer assembly 106 was aimed at prior to manual steering began. In another implementation, the system can use the location where the user discontinues manual steering as a new user set target and control the electro-mechanical assembly 108 to maintain the sonar aimed at the position of this new user set target.

The first implementation would be useful if a fisherman wants to manually steer the transducer assembly 106 such as to follow a fish that may be leaving the current user set target or to quickly check a position adjacent the current user set target but then return to fishing the user set target that was selected prior to manual steer.

The second implementation would be useful if a fisherman wants to transition from being aimed at a first user set target but then wants to transition to aim at a new user set target and does not want to return to the user set target that was selected prior to manual steer. In one instance of this second implementation, the position of the new user set target could be generated using a heading and distance as outlined above.

In one implementation, while in the continuous target lock mode, when the user discontinues manual steer, a notification could pop up querying the user if they want to target lock at the new location or return to the prior location. The system could be user configured to default to either situation. As such, if the user does not input a response to the query, the system will automatically return to either the prior user set point or stay aimed at the new user set point depending on the configuration of the system.

While the system has been generally described in terms of a complete system, in some implementations, the system may be commercialized without the transducer assembly 106 and/or the fish finder control head. Instead, the system may simply include the controller and the electro-mechanical assembly 108. The electro-mechanical assembly 108 may be configured to mount the transducer assembly 106 thereto. The electro-mechanical assembly 108 could include one or more of the actuators outlined above for manipulating the position of the transducer assembly. For instance, controller 124, mount 110, motor 112 and shaft 114 could be provided in one system. The positioning system could be provided by a separately provided fish finder control head, for example.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A sonar target locking system to position a sonar array to maintain a beam of the sonar array pointing at an user set target comprising:
    an electro-mechanical assembly operable to carry and position the sonar array;
    a positioning system configured to determine changes in the position of the sonar array relative to a position of the user set target; and
    a controller configured to use the position of the user set target and the changes in the position of the sonar array to control the electro-mechanical assembly to steer the position of the sonar array so that the beam of the sonar array remains pointed at the position of the user set target.

2. The sonar target locking system of claim 1, wherein:
the positioning system is configured to identify a position of the user set target,
    the positioning system has a user input device; and
    the positioning system, in a first mode, identifies the position of the user set target when the user input device is activated, the positioning system identifying the user set target based on an axis defined by an orientation of the sonar array and a distance from a location of the sonar array when the user input device is activated along the axis.

3. The sonar target locking system of claim 2, wherein the sonar array is operably connected to a fish finder control head that displays an image based on data generated by the sonar array, the image having a horizontal distance component, the distance from the sonar array used to identify the user set target is a percentage of the horizontal distance component of the image displayed on the fish finder control head, the percentage being less than 100 percent.

4. The sonar target locking system of claim 2, wherein the distance from the sonar array is a predetermined fixed value.

5. The sonar target locking system of claim 2, wherein the distance from the sonar array is a user defined value.

6. The sonar target locking system of claim 2, wherein the user input device is a button on at least one of a foot pedal and a fish finder control head in operable communication with the positioning system.

7. The sonar target locking system of claim 2, wherein the positioning system includes a GPS unit for determining changes in the position of the sonar array relative to the user set target.

8. The sonar target locking system of claim 2, wherein the orientation of the sonar array is determined using a heading sensor.

9. The sonar target locking system of claim 7, wherein in a second mode, the position of the user set target is identified by a user input waypoint having coordinates within a coordinate system of the GPS unit.

10. The sonar target locking system of claim 9, wherein in the second mode, the coordinates of the waypoint can be identified by a user selecting a location representative of a map being displayed on a fish finder control unit in communication with the positioning system.

11. The sonar target locking system of claim 2, wherein the distance from the sonar array is measured in a horizontal plane.

12. The sonar target locking system of claim 2, wherein the distance from the sonar array is compensated by a depth component.

13. A sonar imaging system comprising:
    a sonar target locking system of claim 2; and
    a sonar array attached to the electro-mechanical assembly.

14. The sonar target locking system of claim 1, wherein the electro-mechanical assembly includes a first actuator for rotating the sonar array about a first axis being horizontal.

15. The sonar target locking system of claim 14, wherein the controller automatically controls the first actuator based on changes in depth information at either of a location of the sonar array or the position of the user set target.

16. The sonar target locking system of claim 15, wherein the controller controls the first actuator to orient the beam of the sonar array to be more outward facing when the depth information indicates a decrease in depth and the controller controls the second actuator to orient the beam of the sonar array to be more downward facing when the depth information indicates an increase in depth.

17. The sonar target locking system of claim 14, further comprising a user input device for selectively generating a first control signal to actuate the first actuator to rotate in a first direction about the first axis and for selectively generating a second control signal to actuate the first actuator to rotate in a second direction about the second axis, the second direction being opposite the first direction.

18. The sonar target locking system of claim 14, further comprising a second actuator for rotating about a second axis being vertical.

19. The sonar target locking system of claim 18, wherein the first actuator makes adjustments in an orientation of the beam in a vertical plane and the second actuator makes adjustments in the orientation of the beam in a horizontal plane.

20. A sonar imaging system comprising:
   a sonar target locking system of claim 14;
   a sonar array attached to the electro-mechanical assembly.

21. The sonar positioning system of claim 1, wherein the controller is configured to automatically control the electro-mechanical assembly to orient the sonar array to a predetermined orientation upon an input signal.

22. The sonar positioning system of claim 21, wherein:
   the electro-mechanical assembly is deployable and stowable between a deployed position where the sonar array would be carried within a body of water and a stowed position wherein the sonar array would be carried out of the body of water; and
   the input signal is generated upon a transition of the electro-mechanical assembly from the stowed position to the deployed position.

23. The sonar positioning system of claim 21, wherein the predetermined orientation corresponds to:
   orienting the beam of the sonar array parallel to a centerline of a watercraft to which the electro-mechanical assembly is mounted; or
   orienting the beam of the sonar array towards the position of a user set target that was created prior to the electro-mechanical assembly being deployed and the input signal is deployment of the electro-mechanical assembly.

24. The sonar target locking system of claim 1, further comprising a user input device for manually controlling the electro-mechanical assembly to position the sonar array;
   wherein when the controller is controlling the electro-mechanical assembly to steer the position of the sonar array based on changes in the position of the sonar array relative to the user set target and the user input device is activated to manually control the electro-mechanical assembly to manually steer the position of the sonar array, upon discontinued manual control of the electro-mechanical assembly, the controller automatically controls the electro-mechanical assembly to aim the sonar array such that the beam is aimed at the position of the user set target at which the beam was being aimed prior to activation of the user input device.

25. The target locking system of claim 1, further comprising a user input device for manually controlling the electro-mechanical assembly to position the sonar array;
   wherein when the controller is controlling the electro-mechanical assembly to steer the position of the sonar array based on changes in the position of the sonar array relative to the user set target and the user input device is activated to manually control the electro-mechanical assembly to manually steer the position of the sonar array, upon discontinued manual control of the electro-mechanical assembly, the positioning system identifies a position of a new user set target, the controller automatically controls the electro-mechanical assembly to steer the position of the sonar array to maintain the beam aimed at the position of the new user set target.

26. The sonar target locking system of claim 25, wherein the position of the new user set target is identified based on a heading of the sonar array when manual control of the electro-mechanical assembly is discontinued in combination with a distance from sonar array.

27. The sonar target locking system of claim 1, wherein the electro-mechanical assembly includes a first actuator for rotating the sonar array about a first axis that is a vertical axis.

28. The sonar target locking system of claim 1, wherein the position of the user set target is a user input waypoint having coordinates within a coordinate system of a GPS unit of the positioning system.

29. A method of maintaining a sonar array pointed at a user set target, comprising:
   identifying a position of a user set target by determining an orientation of the sonar array and using a distance from the position of the sonar array along an axis defined by the orientation of the sonar array;
   pointing the sonar array at a position of the user set target;
   determining changes in the position of the sonar array relative to the position of the user set target, with a controller;
   maintaining the sonar array pointed at the position of the user set target by controlling an electro-mechanical assembly carrying the sonar array to adjust a position of the sonar array, with control signals generated by the controller.

\* \* \* \* \*